United States Patent
Ozawa et al.

(10) Patent No.: US 12,052,478 B2
(45) Date of Patent: *Jul. 30, 2024

(54) SYSTEMS, METHODS, AND APPARATUSES FOR CAPTIONS DATA CONVERSION

(71) Applicant: Comcast Cable Communications, LLC, Philadelphia, PA (US)

(72) Inventors: Toshiro Ozawa, Irvine, CA (US); Hirotaka Oku, Irvine, CA (US); Christopher Gordon, Irvine, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,000

(22) Filed: Apr. 21, 2023

(65) Prior Publication Data

US 2023/0254545 A1    Aug. 10, 2023

Related U.S. Application Data

(63) Continuation of application No. 17/515,000, filed on Oct. 29, 2021, now Pat. No. 11,678,023.

(51) Int. Cl.
*H04N 21/488* (2011.01)
*H04L 65/60* (2022.01)

(52) U.S. Cl.
CPC ......... *H04N 21/4884* (2013.01); *H04L 65/60* (2013.01)

(58) Field of Classification Search
CPC ........... H04N 21/4884; H04N 21/2187; H04N 21/2355; H04N 21/44008; H04N 21/47202; H04N 21/2358; H04N 21/43074; H04N 21/4782; H04L 65/60
See application file for complete search history.

(56) References Cited

U.S. PATENT DOCUMENTS

| | | | |
|---|---|---|---|
| 7,643,089 B2 * | 1/2010 | Oku | H04N 21/42638 348/565 |
| 8,695,048 B1 * | 4/2014 | Kellicker | H04N 21/47202 725/91 |
| 8,782,721 B1 * | 7/2014 | Kellicker | H04N 21/234336 725/91 |
| 8,782,722 B1 * | 7/2014 | Kellicker | H04N 21/234336 725/91 |
| 9,124,910 B2 | 9/2015 | Kellicker | |
| 9,319,626 B2 * | 4/2016 | Kellicker | H04N 21/4888 |
| 9,456,170 B1 * | 9/2016 | Miller | G11B 27/10 |
| 10,230,812 B1 | 3/2019 | Ram | |

(Continued)

FOREIGN PATENT DOCUMENTS

| JP | 2017204695 A1 | 11/2017 |
|---|---|---|
| JP | 6715910 B2 | 11/2018 |

*Primary Examiner* — David R Lazaro
(74) *Attorney, Agent, or Firm* — Ballard Spahr LLP

(57) ABSTRACT

Methods, systems, and apparatuses for captions data handling, conversion between formats, and presentation are described herein. Segments of a content item may contain captions data in different formats, where conversion between one format to another may be required when one format is not compatible with a computing device or presentation settings. The captions data may be converted to a compatible format(s). The embedded captions data may be converted on a segment-by-segment basis and/or in real-time for streaming content.

34 Claims, 11 Drawing Sheets

(56) References Cited

U.S. PATENT DOCUMENTS

| | | | | |
|---|---|---|---|---|
| 11,678,023 | B2* | 6/2023 | Ozawa | H04N 21/8456 |
| | | | | 709/219 |
| 2010/0106482 | A1* | 4/2010 | Hardacker | H04N 21/8133 |
| | | | | 348/468 |
| 2016/0182979 | A1* | 6/2016 | McCoy | H04N 21/2183 |
| | | | | 725/32 |
| 2016/0322080 | A1* | 11/2016 | Stankiewicz | G11B 27/32 |
| 2017/0278525 | A1* | 9/2017 | Wang | G10L 15/20 |
| 2019/0286691 | A1* | 9/2019 | Sodhani | G06F 40/216 |
| 2020/0051582 | A1* | 2/2020 | Gilson | H04N 21/233 |
| 2023/0138712 | A1* | 5/2023 | Ozawa | H04L 65/60 |
| | | | | 709/219 |
| 2023/0254545 | A1* | 8/2023 | Ozawa | H04N 21/4884 |
| | | | | 709/219 |

* cited by examiner

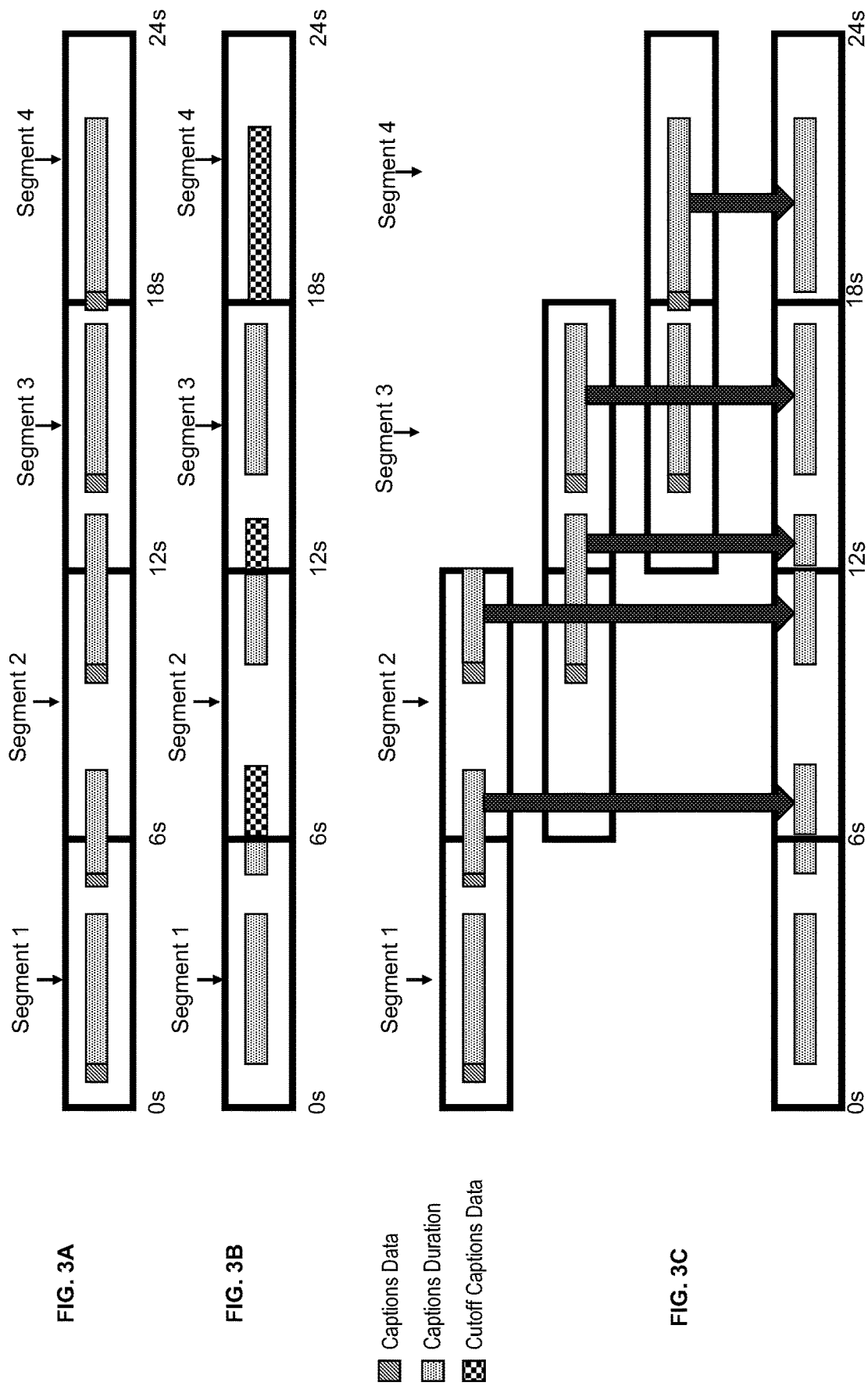

SEGMENTS FOR PLAYLIST n

```
#EXTM3U
#EXT-X-VERSION:3
#EXT-X-TARGETDURATION:6
#EXT-X-MEDIA-SEQUENCE:302619   ~501
#EXT-X-PROGRAM-DATE-TIME:2020-07-22T17:21:49.067Z
#EXTINF:6.000000,
302619.ts
#EXTINF:6.000000,
302620.ts
#EXTINF:6.000000,
302621.ts
#EXTINF:6.000000,
302622.ts
#EXTINF:6.000000,
302623.ts
#EXTINF:6.000000,
302624.ts
#EXTINF:6.000000,
302625.ts
#EXTINF:6.000000,
302626.ts
#EXTINF:6.000000,
302627.ts
#EXTINF:6.000000,
302628.ts
```

FIG. 5A

CAPTIONS DATA FOR PLAYLIST n

```
#EXTM3U
#EXT-X-VERSION:3
#EXT-X-TARGETDURATION:6
#EXT-X-MEDIA-SEQUENCE:302619   ~501
#EXT-X-PROGRAM-DATE-TIME:2020-07-22T17:21:49.067Z
#EXTINF:6.000000,
302619.vtt
#EXTINF:6.000000,
302620.vtt
#EXTINF:6.000000,
302621.vtt
#EXTINF:6.000000,
302622.vtt
#EXTINF:6.000000,
302623.vtt
#EXTINF:6.000000,
302624.vtt
#EXTINF:6.000000,
302625.vtt
#EXTINF:6.000000,
302626.vtt
#EXTINF:6.000000,
302627.vtt
#EXTINF:6.000000,
302628.vtt
```

FIG. 5B

```
CAPTIONS DATA FOR SEGMENT n
WEBVTT
X-TIMESTAMP-
MAP=MPEGS:6530344344,LOCAL:00:00:00
.000
                  ┌─602A
1
00:00:03.801 --> 00:00:04.765
And he's got like three kids,
                  ┌─602B
2
00:00:04.801 --> 00:00:05.998
but he has like the
old-fashioned bubble guy.
```

FIG. 6A

```
CAPTIONS DATA FOR SEGMENT N'    ┌─600B
WEBVTT
X-TIMESTAMP-
MAP=MPEGS:6529804344,LOCAL:00:00:00
.000
                  ┌─601A
1
00:00:03.367 --> 00:00:04.199
he's got like rope in the back.
                  ┌─601B
2
00:00:04.234 --> 00:00:06.432
I don't know what he's doing.
                  ┌─601C
3
00:00:06.467 --> 00:00:09.765
The rope did it! I'm watching this!
Right?
                  ┌─603A
4
00:00:09.801 --> 00:00:10.765
And he's got like three kids,
                  ┌─603B
5
00:00:10.801 --> 00:00:11.998
but he has like the
old-fashioned bubble guy.
```

FIG. 6B

```
CONVERTED CAPTIONS DATA FOR SEGMENT n
WEBVTT                           ┌─600A
X-TIMESTAMP-
MAP=MPEGS:6530344344,LOCAL:00:00:00
.000
                  ┌─604A
1
00:00:00.010 --> 00:00:00.432
I don't know what he's doing.
                  ┌─604B
2
00:00:00.467 --> 00:00:03.765
The rope did it! I'm watching this!
Right?
                  ┌─604C
3
00:00:03.801 --> 00:00:04.765
And he's got like three kids,
                  ┌─604D
4
00:00:04.801 --> 00:00:05.998
but he has like the
old-fashioned bubble guy.
```

FIG. 6C

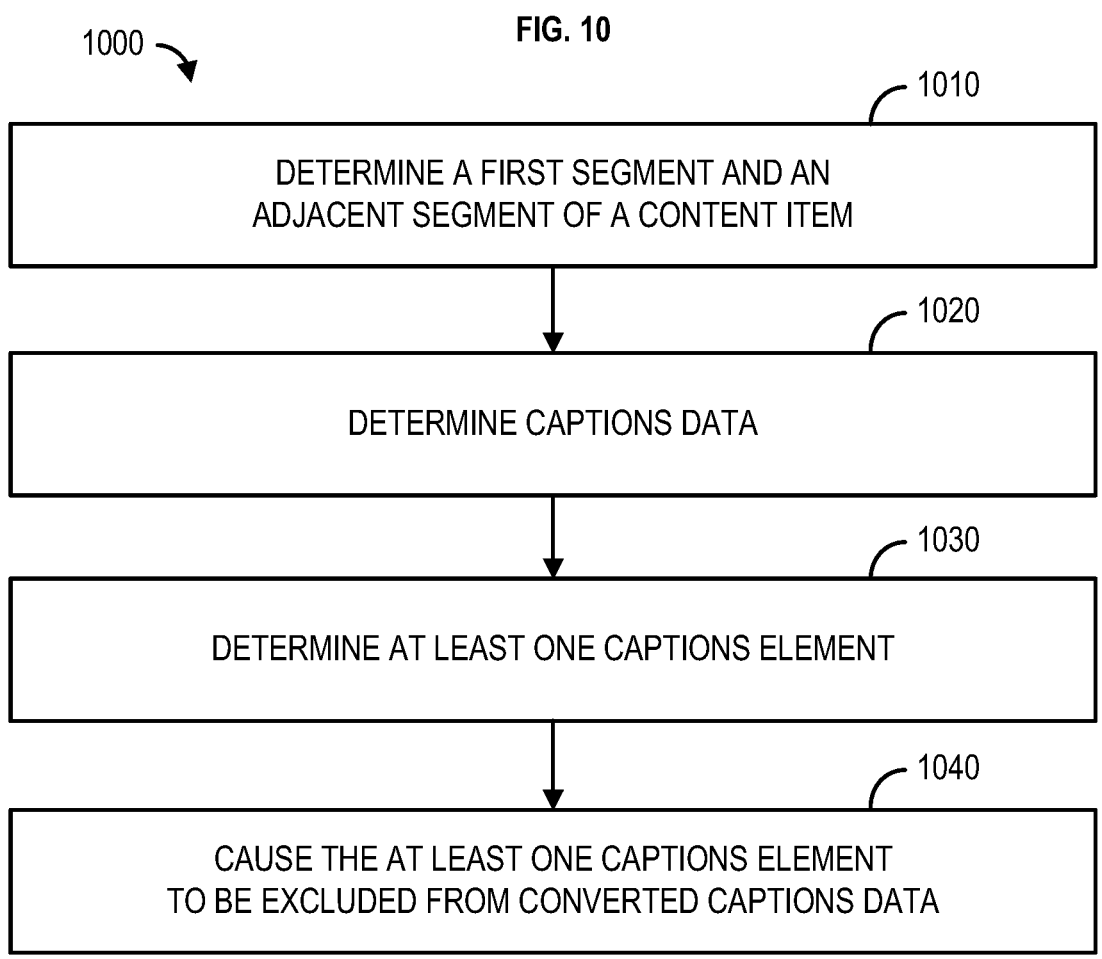

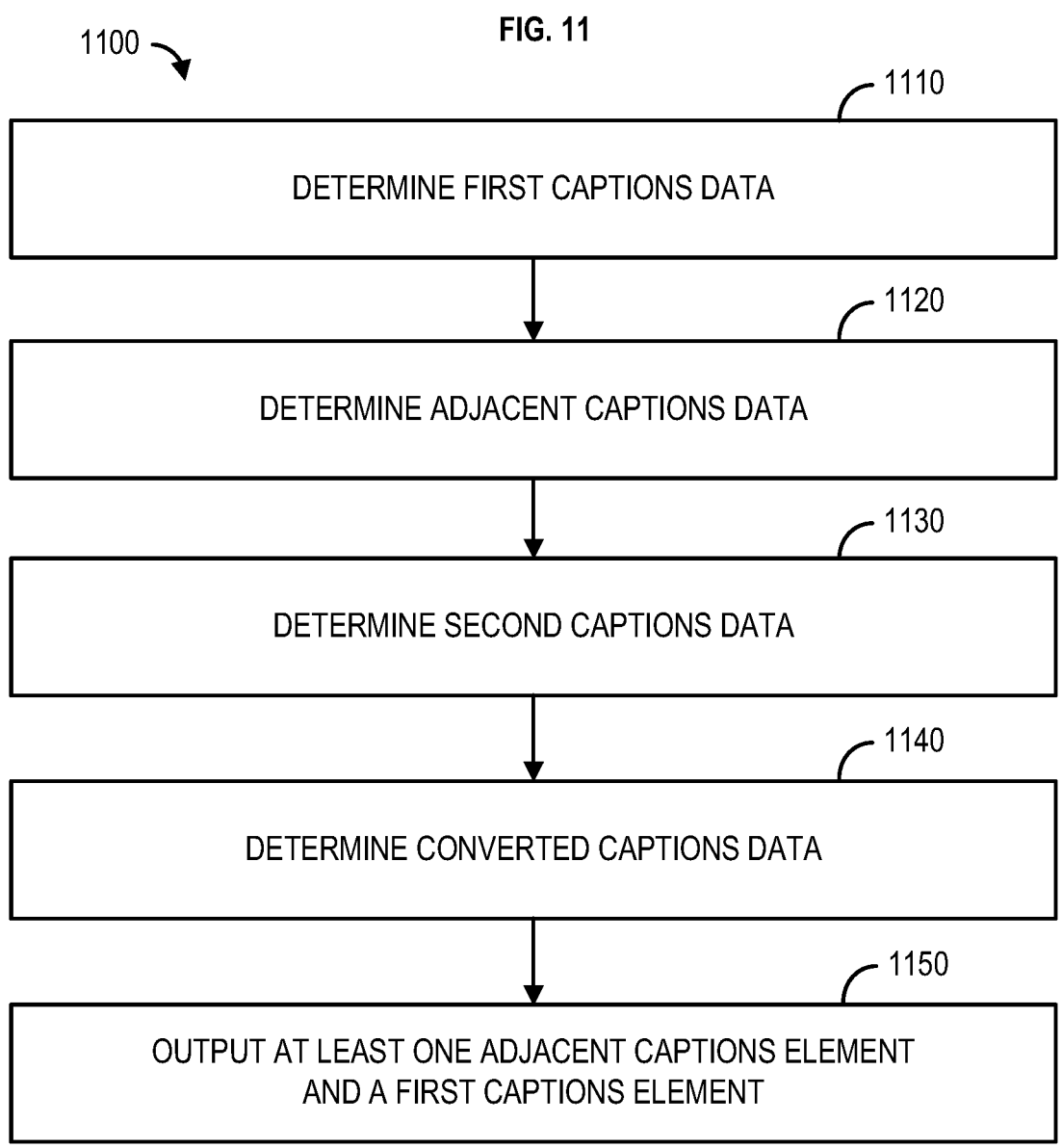

SYSTEMS, METHODS, AND APPARATUSES FOR CAPTIONS DATA CONVERSION

CROSS-REFERENCE TO RELATED APPLICATION

This application is a continuation of U.S. application Ser. No. 17/515,000, filed on Oct. 29, 2021, which is incorporated by reference in its entirety herein.

BACKGROUND

Video content is often embedded with captions data for closed captioning. Embedded captions data allows computing devices to present closed captions without accessing a separate file or data stream. However, some computing devices and/or content platforms may not support certain formats of embedded captions data—or they may not support them at all. Instead, such devices and platforms may require captions data to be delivered in a separate file or data stream. These and other considerations are discussed herein.

SUMMARY

It is to be understood that both the following general description and the following detailed description are exemplary and explanatory only and are not restrictive. Methods, systems, and apparatuses for captions data management, handling, conversion when necessary, and presentation are described herein. Segments of content items, such as video content items, may contain (e.g., be encoded with, carry as embedded data) captions data in a format(s) that is not compatible with some computing devices, presentation or user settings, or other parameters. It may not be desirable to retrieve captions data from another source, such as a separate file or data stream. Instead, the embedded captions data may be converted to a compatible format(s). The embedded captions data may be converted on a segment-by-segment basis, and, as discussed below, presented in real-time for live streaming content.

In some scenarios, captions may overlap two (or more) video segments. For example, a first captions element of a first content item may correspond to a sentence spoken by a character during an ending portion of an adjacent segment and a beginning portion of a first segment that follows the adjacent segment. However, corresponding captions data for the first captions element may only be contained within the embedded captions data for the adjacent segment. Conversion of the embedded captions data for the first segment may use a sliding window and/or lookback process to capture the corresponding captions data for the first captions element. For example, captions data may be extracted from the embedded captions data of the first segment as well as the embedded captions data of the adjacent segment. The extracted captions data may comprise the corresponding captions data for the first captions element, such as captions identifiers, as well as timing data for the adjacent segment and the first segment. The extracted captions data may be used to determine a portion of the first captions element associated with the first segment. Converted captions data for the first segment may comprise all relevant captions data for the portion of the first captions element. The converted captions data may be used by computing devices that are not compatible with the particular format(s) of the embedded captions data for the first segment.

Additional advantages will be set forth in part in the description which follows or may be learned by practice.

The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIGS. 3A-3C show example content segments;
FIGS. 5A and 5B show example captions data;
FIGS. 6A-6C show example captions data;
FIG. 10 shows a flowchart for an example method;
and
FIG. 11 shows a flowchart for an example method.

DETAILED DESCRIPTION

Figure 1:
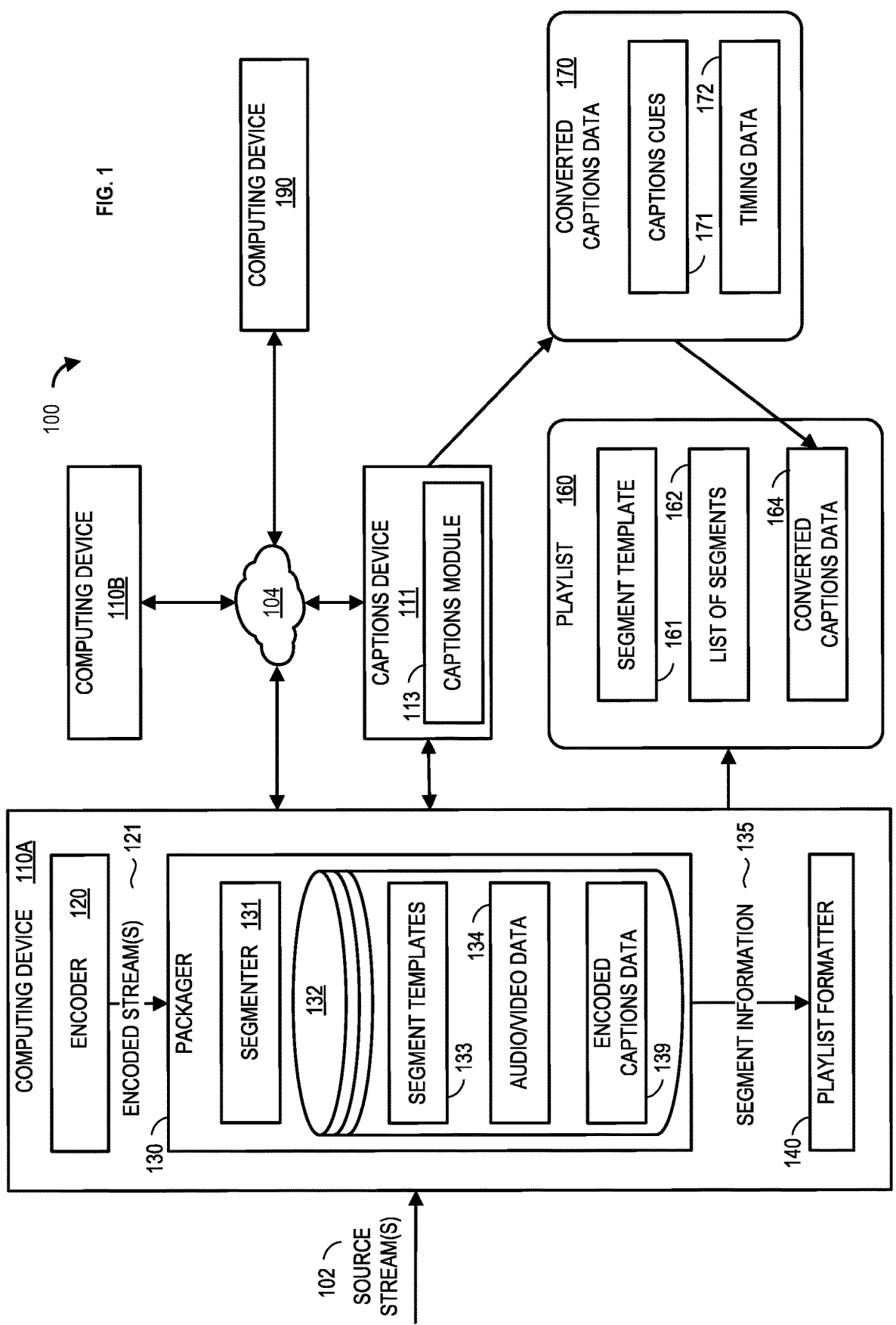
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Methods, systems, and apparatuses for captions data conversion are described herein. Segments of content items, such as video content items streamed using HTTP Live Streaming (HLS), may comprise embedded captions data for closed captioning. Some computing devices and/or content platforms may not support certain formats of embedded captions data, such as the CEA-608/EIA-708 closed captions format, and they may require captions data for content items to be delivered in another format (e.g., WebVTT) via a separate file or data stream. For example, an encoded stream may comprise a plurality of segments of a content item that are each encoded with embedded captions data. The embedded captions data may be converted on a segment-by-segment basis and/or in real-time (e.g., for a live streaming content item). To minimize a processing time, the plurality of segments used for the conversion of the embedded captions data may comprise a variant (e.g., representation) of the content item having a lowest bitrate/resolution.

In some scenarios, a captions element may overlap two video segments of the content item. For example, a first captions element may correspond to a sentence spoken by a character during an ending portion of an adjacent segment and a beginning portion of a first segment that follows the adjacent segment. However, captions data for the first captions element may only be contained within the embedded captions data for the adjacent segment. Conversion of the embedded captions data for the first segment may use a sliding window and/or lookback process to capture the captions data for the first captions element from the embedded captions data for the adjacent segment. For example, the first segment may be concatenated with the adjacent segment, and the captions data for the first captions element, as well as timing data for the first segment and the adjacent segment, may be extracted from the resulting concatenated segment. While the first segment is described herein as being a segment that sequentially follows the adjacent segment, it is to be understood that the adjacent segment may—or may not—directly precede the first segment. The adjacent segment may be a segment that directly precedes the first segment. For example, the first segment may be segment "n" of a plurality of segments, and the adjacent segment may be segment "n−1" of the plurality of segments. The adjacent segment may be a segment that is one—or more—segments away from the first segment. For example, the first segment may be segment "n" of a plurality of segments, and the adjacent segment may be segment "n−m" of the plurality of segments, where m represents a value greater than 1. Other examples are possible as well.

The timing data may be used to determine a portion of the first captions element associated with the first segment. For example, the captions data for the first captions element may comprise caption cues indicative of a beginning time code and an ending time code of the first captions element. The portion of the first captions element associated with the first segment may be determined using the caption cues and the timing data. The portion of the first captions element may be synchronized with the first segment using presentation timestamp values associated with the first segment. This may allow an additional segment(s) of video, such as an advertisement/commercial, to be inserted (e.g., spliced) into the encoded stream before or after the first segment while maintaining synchronization between the first segment and the portion of the first captions element.

The converted captions data for the first segment may comprise captions data corresponding to the portion of the first captions element. The converted captions data may comprise a playlist file, such as a side-car caption file (e.g., a WebVTT file), a WebVTT manifest file, a combination thereof, and/or the like. The converted captions data may be determined/generated based on a computing device type or a user device type to ensure compatibility. A master playlist for the content item (e.g., a master manifest file) may comprise a plurality of variant playlists for the content item (e.g., variant manifest files) corresponding to each bitrate/resolution available. A reference(s) to the converted captions data may be added to each of the plurality of variant playlists. Embedded captions data for new segments may be converted each time the master playlist and/or any of the plurality of variant playlists are updated (e.g., as new segments are encoded).

FIG. 1 shows an example system 100 for captions data conversion. The word "caption"—or "captions"—as used herein may refer to any timed/synchronized display of alphanumeric and/or symbolic characters during output of content (e.g., audio and/or video) for purposes of accessibility (e.g., closed captioning), translation (e.g., subtitles), and/or any other purpose. The system 100 may comprise a content delivery network, a data network, a content distribution network, a combination thereof, and/or the like. The system 100 may comprise a computing device 110A in communication with a plurality of other devices via a network 104. The network 104 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 104 via a variety of transmission paths, including wireless paths (e.g., satellite paths, Wi-Fi paths, cellular paths, etc.) and terrestrial paths (e.g., wired paths, a direct feed source via a direct line, etc.).

The computing device 110A may be an origin device (e.g., a content origin and/or content source) comprising a server, an encoder, a decoder, a packager, a combination thereof, and/or the like. The computing device 110A may generate and/or output portions of content, such as segments or fragments of encoded content (e.g., content streams). For example, the computing device 110A may convert raw versions of content (e.g., broadcast content) into compressed or otherwise more "consumable" versions suitable for playback/output by user devices, media devices, and other consumer-level computing devices. "Consumable" versions of content—or portions thereof—generated and/or output by an origin computing device may include, for example, data files adhering to H.264/MPEG-AVC, H.265/MPEG-HEVC, H.266/MPEG-VVC, MPEG-5 EVC, MPEG-5 LCEVC, AV1, MPEG2, MPEG, MPEG4 UHD, SDR, HDR, 4k, Adobe® Flash® Video (.FLV), ITU-T H.261, ITU-T H.262 (MPEG-2 video), ITU-T H.263, ITU-T H.264 (MPEG-4 AVC), ITU-T H.265 (MPEG HEVC), ITU-T H.266 (MPEG VVC) or any other video file format, whether such format is presently known or developed in the future. For ease of explanation, when referring to the computing device 110A, the description herein may use the phrase "origin computing device" in the singular form. However, it is to be understood that an origin computing device may comprise a plurality of servers and/or a plurality devices that operate as a system to generate and/or output portions of content, convert raw versions of content (e.g., broadcast content) into compressed or otherwise more "consumable" versions, etc.

The system 100 may comprise a computing device 110B. The computing device 110B may be an origin device (e.g., a content origin and/or content source) comprising a server, an encoder, a decoder, a packager, a combination thereof, and/or the like. The computing device 110B may function similarly to the computing device 110A. For example, the computing device 110B may serve as a backup for the computing device 110A in the event the computing device 110A fails or is otherwise unavailable, and the computing device 110A may serve as a backup for the computing device 110B in the event the computing device 110B fails or is otherwise unavailable. While FIG. 1 shows two origin computing devices—the computing device 110A and the computing device 110B—for explanatory purposes, it is to be understood that the system 100 may comprise a plurality of origin computing devices that function similarly those shown and described herein.

The system 100 may comprise a computing device 190. The computing device 190 may comprise a content/media player, a set-top box, a client device, a smart device, a mobile device, a user device, a caching device (e.g., an edge cache, a mid-tier cache, a cloud cache), a combination thereof, and/or the like. The computing device 110A and the computing device 190 may communicate via the network 104. The computing device 190 may receive portions of requested content (e.g., streams, segments, fragments, etc.) from the computing device 110A. The computing device 190 may send requests for portions of content directly to the computing device 190 or via one or more intermediary computing devices (not shown), such as caching devices, routing devices, etc. As further described herein, the computing device 190 may support certain formats of captions data for closed captioning, such as the WebVTT format, but may not support other formats of captions data, such as embedded captions data using the CEA-608/EIA-708 format, the CEA-708 format, the CTA-608/708 format, a combination thereof, and/or the like. For purposes of explanation, the description herein may simply refer to the CEA-608/EIA-708 format; however, it is to be understood that other formats of captions data other than those described herein are contemplated. The system 100 may perform captions data conversion using any format of captions data. While FIG. 1 shows a single computing device 190 for explanatory purposes, it is to be understood that the system 100 may comprise a plurality of computing devices that function similarly to the computing device 190.

The computing device 110A may comprise a plurality of modules/components, such as an encoder 120, a packager 130, and/or a playlist formatter 140, each of which may correspond to hardware, software (e.g., instructions executable by one or more processors of the computing device 110A), or a combination thereof. The encoder 120 may perform bitrate conversion, coder/decoder (CODEC) conversion, frame size conversion, etc. For example, the computing device 110A may receive a content source stream 102, and the encoder 120 may encode the source stream 102 to generate one or more encoded streams 121 (e.g., encoded portions of content, such as segments, fra. The source stream 102 may be a live stream (e.g., a linear content stream) or a video-on-demand (VOD) stream. The computing device 110A may receive the source stream 102 from an external source (e.g., a stream capture source, a data storage device, a media server, etc.). The computing device 110A may receive the source stream 102 via a wired or wireless network connection, such as the network 104 or another network (not shown). Although a single source stream 102 is shown in FIG. 1, the computing device 110A may receive any number of source streams 102 for any number of content items.

The encoder 120 may generate a plurality of encoded streams 121. Each encoded stream of the plurality of encoded streams 121 may correspond to a particular adaptive bitrate (ABR) representation of a content item received via the source stream 102. For example, the plurality of encoded streams 121 may differ from one other with respect to an audio bitrate(s), a number of audio channels, an audio CODEC(s), a video bitrate(s), a video frame size(s), a video CODEC(s), a combination thereof, and/or the like. The encoder 120 may encode the source stream 102 such that key frames (e.g., intra-coded frames (I-frames)) in the plurality of encoded streams 121 occur corresponding times as in the source stream 102. That is, each of the plurality of encoded streams 121 may be "key frame aligned" to enable seamless switching between different ABR representations by a destination device (e.g., the computing device 190).

The packager 130 may comprise a segmenter 131 and a data storage device 132. The data storage device 132 may be a component of the packager 130, as shown in FIG. 1, or it may be a separate device/entity within the system 100 (e.g., a cache device, data storage repository, database, etc.) in communication with the packager 130. The segmenter 131 may divide a set of ABR representations of content items (e.g., the plurality encoded streams 121) into media segments/fragments. For example, the segmenter 131 may receive a target segment duration, such as a quantity of milliseconds, seconds, minutes, etc. The target segment duration may be received via user input (e.g., at the computing device 190 or a user profile); it may be determined via a configuration file at the computing device 110A and/or the computing device 190; it may be determined based on properties of the source stream 102; it may be received via the computing device 110A; it may be a combination thereof, and/or the like. For example, if the target segment duration is ten seconds, the segmenter 131 may segment (e.g., separate, divide, etc.) the plurality of encoded streams 121 into segments (e.g., at key frame boundaries). The segments may comprise a set duration, such as 5-6 seconds, depending on a format of the segments.

The computing device 110A may support multiple content segmentation types (e.g., formats). The segmenter 131 may generate segments for each of the content segmentation types supported by the computing device 110A. Segments may be referred to as "chunks" herein. The computing device 110A may support both multiplexed segments (video and audio data included in a single multiplexed stream) and non-multiplexed segments (video and audio data included in separate non-multiplexed streams). For example, in the case of segments adhering the MPEG-DASH or HLS standards, the computing device 110A may support container formats in compliance with an international standards organization base media file format (e.g., ISOBMFF, associated with a file extension ".m4 s"), motion picture experts group 2 transport stream (e.g., MPEG-TS), extensible binary markup language (e.g., EBML), WebM, Matroska, or any combination thereof.

The segmenter 131 may employ a "smart" storage system to avoid replicating audio/video data during generation of segments for each content segmentation type. For example, if the computing device 110A supports N content segmentation types (where N is an integer greater than zero), the segmenter 131 may generate N segment templates 133 for each segment (e.g., portion) of each of the plurality of encoded streams 121. Each segment template 133 may comprise or refer to timing data for the segment based on a given format of the segment. In the example of MPEG-DASH and/or HLS segments, different segment templates may be generated for ISOBMFF multiplexed ("muxed"), ISOBMFF non-multiplexed ("demuxed"), MPEG-TS muxed, MPEG-TS demuxed, EBML muxed, EBML demuxed, etc.

The timing data may comprise or indicate a start position/start time of a particular segment and an end position/end time of the particular segment in the source stream 102. For example, the timing data for a particular segment may comprise presentation timestamp (PTS) values that relate a time that the particular segment was encoded and/or transcoded (e.g., by the encoder 120) to a beginning of the particular content item. The PTS values for a particular segment may ensure that underlying audio/video data 134 (e.g., audio and video frames) for the segment is synchronized.

The source stream 102 may comprise textual information for each content item. The textual information may comprise closed captioning/subtitle content. The textual information may be encoded into the plurality of encoded streams 121 by the encoder 120. For example, captions data corresponding to the textual information may be encoded into each of the plurality of encoded streams 121. Each of the segments generated by the segmenter 131 may comprise corresponding captions data, referred to herein as encoded captions data 139. The encoded captions data 139 may comprise embedded captions data, such as captions data adhering to the CEA-608/EIA-708 closed captions format. For example, the encoded captions data 139 may enable a decoder (e.g., at the computing device 190) to decode a particular segment and present the corresponding video content and audio content with closed captioning/subtitle content embedded therein. The encoded captions data 139 for a particular segment may comprise caption cues indicative of a beginning time code and an ending time code of for each captions element. A captions element as described herein may comprise a portion of closed captioning/subtitle content, such as a word(s), a sentence(s), a description, and/or any other information that may be conveyed via closed captioning/subtitle content. The timing data and the caption cues for a particular segment may be used to ensure that closed captioning/subtitle content associated with the segment is aligned with audio/video data 134 (e.g., encoded video content and/or audio content) during playback (e.g., at the computing device 190). For example, PTS values indicated by the timing data of a particular segment may be synchronized with the underlying audio/video data 134 of the particular segment using with the caption cues associated with the closed captioning/subtitle content of the segment.

Each of the segment templates 133 may not include the underlying audio/video data 134 (e.g., audio and video frames) and/or the underlying encoded captions data 139 of the corresponding segment. For example, while multiple segment templates 133 may be generated for each segment of the source stream 102, the underlying audio/video data 134 and/or the underlying encoded captions data 139 for each segment may be stored once for each ABR representation. As the segment templates 133 are generated, the segmenter 131 may generate and/or send segment information 135 regarding the segment templates 133 to a playlist formatter 140. The segment information 135 for a particular segment may comprise the corresponding segment template 133 and refer to (e.g., be indicative of a storage location of) the underlying audio/video data 134 (e.g., audio and video frames) and/or the underlying encoded captions data 139 (e.g., the closed captioning/subtitle content of the segment).

The playlist formatter 140 may generate playlists based on the segment information 135 received from the packager 130, including information associated with the segment(s) of the adaptive streaming representation(s) generated by the encoder 120. The playlists may comprise manifest files, such as MPEG-DASH media presentation description (MPD) files for MPEG-DASH and/or HLS content.

The term "playlist" as used herein (e.g., a "playlist," a "variant playlist," a "master playlist," etc.) may comprise a manifest, such as a manifest file, a variant manifest file, a top-level manifest file, etc. Any "playlist" or "manifest" described herein is intended to be protocol-agnostic. For example, any "playlist" or "manifest" described herein may be compatible with any chunk-based, fragment-based, and/or segment-based streaming protocol known or developed.

The playlist formatter 140 may generate one or more playlists (e.g., manifests) based on a manifest type and/or a content segmentation type. If the manifest type is number-based or time-based, the playlist formatter 140 may generate, based on the segment information 135, a playlist 160 that comprises a segment template 161. The segment template 161 may be number-based or time-based. A segment template 161 that is number-based may be used (e.g., by the computing device 190) to construct segment identifiers (e.g., filename(s), URL(s), address(es), etc.) to request individual segments according to corresponding segment number. A segment template 161 that is time-based may be used (e.g., by the computing device 190) to construct segment identifiers to request individual segments according to corresponding segment start time. If the segment template 161 is list-based, the playlist formatter 140 may generate, based on the segment information 135, a playlist 160 that comprises a list of segment identifiers 162. The list of segment identifiers 162 may include segment identifiers that are specific to one or more segments of one or more ABR representations (e.g., one or more variant playlists).

The playlist formatter 140 may generate a separate playlist for each of a plurality of variants the particular content item (e.g., adaptive streaming representations). As further described herein, the playlist formatter 140 may generate a master playlist that references each of the separate playlists for each of the plurality of variants. For example, the encoded streams 121 generated by the encoder 120 may include three variants (e.g., adaptive streaming representations) of the source stream 102: a first variant with a bit rate of 2 megabits per second (Mbps) and a resolution of 720p, a second variant with a bit rate of 750 kilobits per second (Kbps) and a resolution of 160p, and a third variant with a bit rate of 250 kbps and a resolution of 120p. More, fewer, and/or different variants (e.g., adaptive streaming representations) may be generated by the encoder 120. The playlist 160 may comprise the master playlist or a variant playlist, unless otherwise specified herein. The playlist 160 may identify a list of segment identifiers 162 of a particular content item based on the audio/video data 134 (e.g., audio and video frames).

The playlist 160 may identify captions elements based on the encoded captions data 139 (e.g., closed captioning/subtitle content) of each segment. The encoded captions data 139 may comprise embedded captions data, such as captions data using the CEA-608/EIA-708 format. As previously described herein, the computing device 190 may support certain formats of captions data for closed captioning/subtitle content, such as the WebVTT format, but the computing device 190 may not support other formats of captions data, such as embedded captions data using the CEA-608/EIA-708 format. The system 100 may comprise a captions device 111 that for converting captions data that may not be compatible with the computing device 190 into another, compatible format.

The captions device 111 may be in communication with each device shown in the system 100. The captions device 111 may comprise a single computing device, or it may comprise a system/network of computing devices. The captions device 111 may be a separate computing device/entity (e.g., as shown in FIG. 1), or it may be a component of another computing device in the system 100, such as the computing device 110A, the computing device, 110B, or the computing device 190.

The captions device 111 may convert the encoded captions data 139 for a particular segment(s) of a content item into converted captions data 170. The converted captions data 170 of a particular segment may be synchronized with the underlying audio/video data 134 of the segment using caption cues 171 and timing data 172. The caption cues 171 and timing data 172 may be determined/derived from the encoded captions data 139, as further discussed herein. The captions device 111 may modify the playlist(s) 160 for a corresponding content item based on the converted captions data 170. For example, the captions device 111 may modify a master playlist and/or each variant playlist by replacing the encoded captions data 139 (e.g., captions data using the CEA-608/EIA-708 format) with the converted captions data 170 (e.g., captions data in the WebVTT format).

Figure 2A:
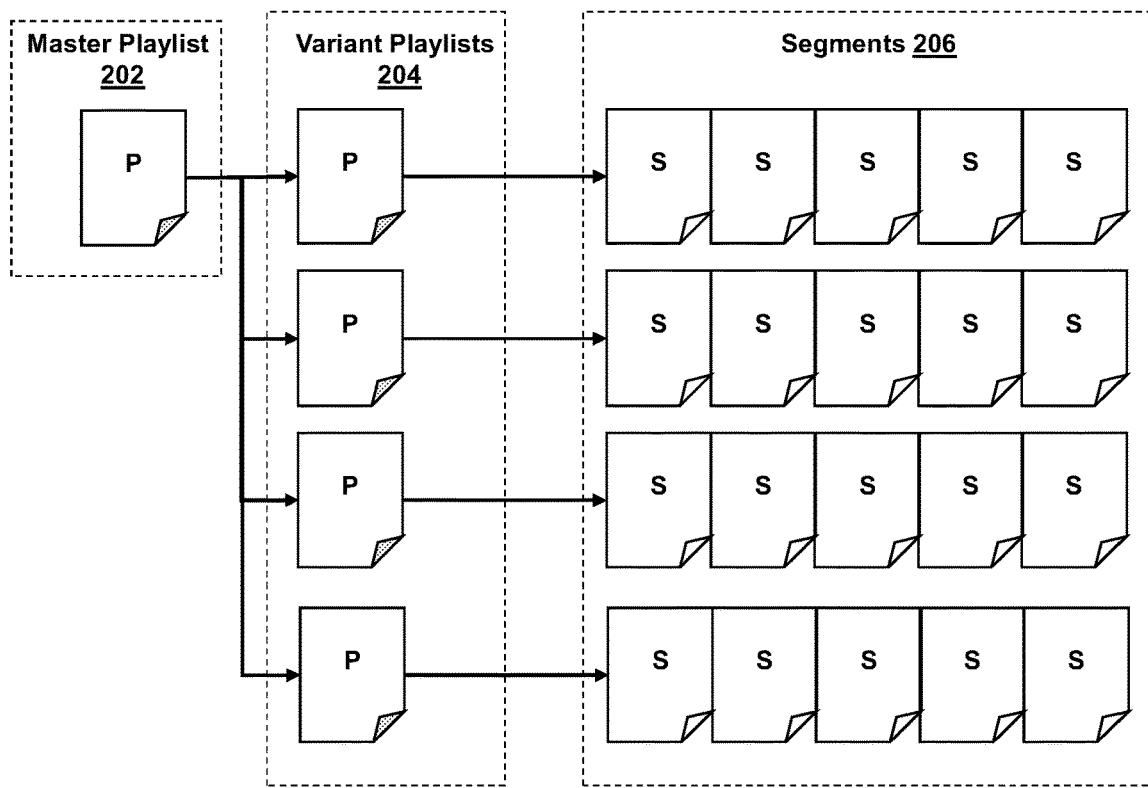
FIGS. 2A and 2B show example playlist files.

FIG. 2A shows an example structure of playlist files for a content item that the playlist formatter 140 may generate and the captions device 111 may modify. For example, the playlist formatter 140 may generate a master playlist 202 for the content item (e.g., a master playlist version of the playlist 160). The master playlist 202 may reference a plurality of variant playlists 204. Each of the plurality of variant playlists 204 may correspond to one of the encoded streams 121 generated by the encoder 120 (e.g., an adaptive streaming representation). Each of the plurality of variant playlists 204 may identify or comprise a plurality of segments 206 (e.g., video/audio segments) of the content item (e.g., generated by the segmenter 131). Each of the plurality of segments 206 may comprise encoded captions data 139 corresponding to one or more embedded captions elements (e.g., using the CEA-608/EIA-708 format).

The captions device 111 may receive, retrieve, access, etc., the master playlist 202 and/or at least one of the plurality of variant playlists 204 to convert the encoded captions data 139 for each of the segments 206 into the converted captions data 170. For example, the captions device 111 may convert each of the one or more embedded captions elements using the embedded captions data 139 of each of the segments 206. The segments 206 may be converted on a segment-by-segment basis and/or in real-time (e.g., for a live streaming content item) as new segments 206 are encoded and added to (e.g., by reference) in the master playlist 202 and the plurality of variant playlists 104. To minimize processing time, the captions device 111 may use the segments 206 corresponding to a variant playlist of the plurality of variant playlist 204 having a lowest bitrate/resolution (referred to herein as the "low bitrate variant 204"). For example, the segments 206 of the low bitrate variant 204 may be encoded faster than the segments 206 for another variant having a higher bitrate/resolution. By using the segments 206 of the low bitrate variant 204, the captions device 111 may convert the embedded captions elements more quickly than if the captions device 111 were to use the segments 206 the other variant having the higher bitrate/resolution.

Figure 2B:
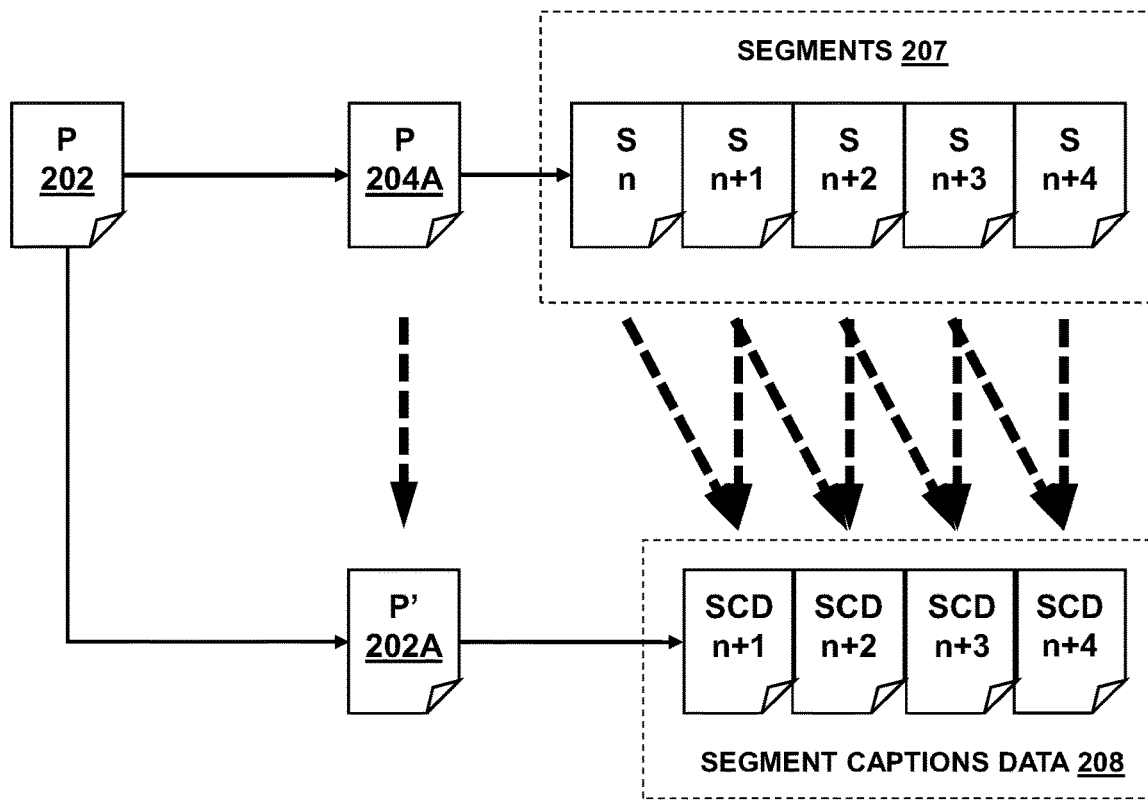

FIG. 2B shows a view of the example structure of playlist files for the content item that focuses on the conversion process implemented by the captions device 111. As shown in FIG. 2B, a variant playlist 204A may comprise a plurality of segments 207. The variant playlist 204A may comprise the low bitrate variant 204 described herein. For example, the variant playlist 204A may have a lowest bitrate/resolution as compared to the other variants 204, and the segments 207 may be encoded at that lowest bitrate/resolution. The segments 207 may comprise a plurality of sequential segments $S_n$, $S_{n+1}$, $S_{n+2}$, $S_{n+3}$, and $S_{n+4}$. In some scenarios, an embedded captions element may overlap two of the segments 207. For example, a first captions element may correspond to a sentence spoken by a character during an ending portion of the segment $S_n$ and a beginning portion of the segment $S_{n+1}$. However, the captions data for the first captions element may only be contained within the encoded captions data 139 for the segment $S_n$. The captions data for the first captions element may comprise caption cues indicative of a beginning time code and an ending time code of the first captions element and timing data associated with both the segment $S_n$ and the segment $S_{n+1}$.

As shown in FIG. 2B and discussed further herein with respect to FIGS. 3A-3C, the captions device 111 may use a sliding window and/or a lookback process when generating the converted captions data 170. The sliding window and/or the lookback process may ensure that captions data for each captions element that overlaps two or more of the segments 207 is captured and converted. The captions device 111 may use the sliding window and/or the lookback process to extract/generate segment captions data 208 $SCD_{n+1}$, $SCD_{n+2}$, $SCD_{n+3}$, and $SCD_{n+4}$ from the encoded captions data 139 of each of the segments 207. The captions device 111 may generate the converted captions data 170 based on the segment captions data 208. The converted captions data 170 may be used to generate a playlist file (or a portion(s) thereof), a side-car file, a WebVTT manifest file and/or index, a combination thereof, and/or the like. For example, the captions device 111 may generate a modified version of the master playlist 160 shown in FIG. 1 and insert the converted captions data 170 as converted captions data 164. FIG. 2B shows a playlist file 202A, which may correspond to the modified version of the master playlist 160 with the converted captions data 164. The playlist file 202A may comprise a playlist file (or a portion(s) thereof), a side-car file, a WebVTT manifest file and/or index, a combination thereof, and/or the like. The captions device 111 may add a reference to (or directly append) the playlist file 202A in the master playlist 202 and/or the plurality of variant playlists 204.

FIGS. 3A-3C show example segment streams that may be processed by the captions device 111 when generating the converted captions data 170. As shown in FIG. 3A, captions data (e.g., textual information for closed captioning/subtitle content) may precede segment data (e.g., video/audio data) in a segment stream. When a captions element overlaps a given segment and an adjacent segment, the corresponding captions data may be associated with the adjacent segment only. That is, the segment data for the adjacent segment may contain all of the corresponding captions data. As a result, the captions device 111 may be unable to generate converted captions data for that captions element without the segment data for the adjacent segment.

As described herein, the captions device 111 may use a sliding window and/or a lookback process when generating the converted captions data 170 to ensure that captions data for each captions element that overlaps two or more of the segments is captured and converted.). For example, as shown in FIG. 3A, Segment 1 may be associated with two captions elements: a first captions element and a second captions element. The first captions element for Segment 1 at time 0 s may begin and end within Segment 1, while the captions data for the second captions element at time 6 s may begin within Segment 1 and end within Segment 2. As a result, the segment data for Segment 2 may not contain the corresponding captions data for the second captions element at time 6 s. Similarly, Segments 2 and 3 may be associated with other captions elements that overlap two or more segments, as shown in FIG. 3A. As a result, captions data for any captions element that overlaps two or more segments may not be contained within the segment data of each associated segment. This is shown in FIG. 3B as "Cutoff Captions Data." For example, the captions element at time 6 s overlaps Segments 1 and 2; however, the captions data for that captions element may be contained within the segment data for Segment 1 only. As a result, the segment data for Segment 2 may not contain the captions data for the captions element at time 6 s—shown in FIG. 3B with a checkered pattern, and the captions device 111 may be unable to generate converted captions data for the captions element at time 6 s. Similarly, the captions device 111 may be unable to generate converted captions data for the captions elements at time 12 s and 18 s when processing Segment 3 and Segment 4, respectively.

FIG. 3C graphically depicts an implementation of the sliding window/lookback process implemented by the captions device 111. As shown in FIG. 3C, when generating converted captions data for Segment 2, the captions device 111 may perform a "look back" to Segment 1 in order to capture the captions data for the captions element at time 6 s. For example, because the captions element at time 6 s begins within Segment 1, the captions data for that captions element may be contained within the encoded captions data associated with Segment 1 (e.g., the encoded captions data 139) rather than encoded captions data for Segment 2. The captions device 111 may use the sliding window/lookback process when processing each of the Segments 2-4, as shown in FIG. 3C.

Figure 4:
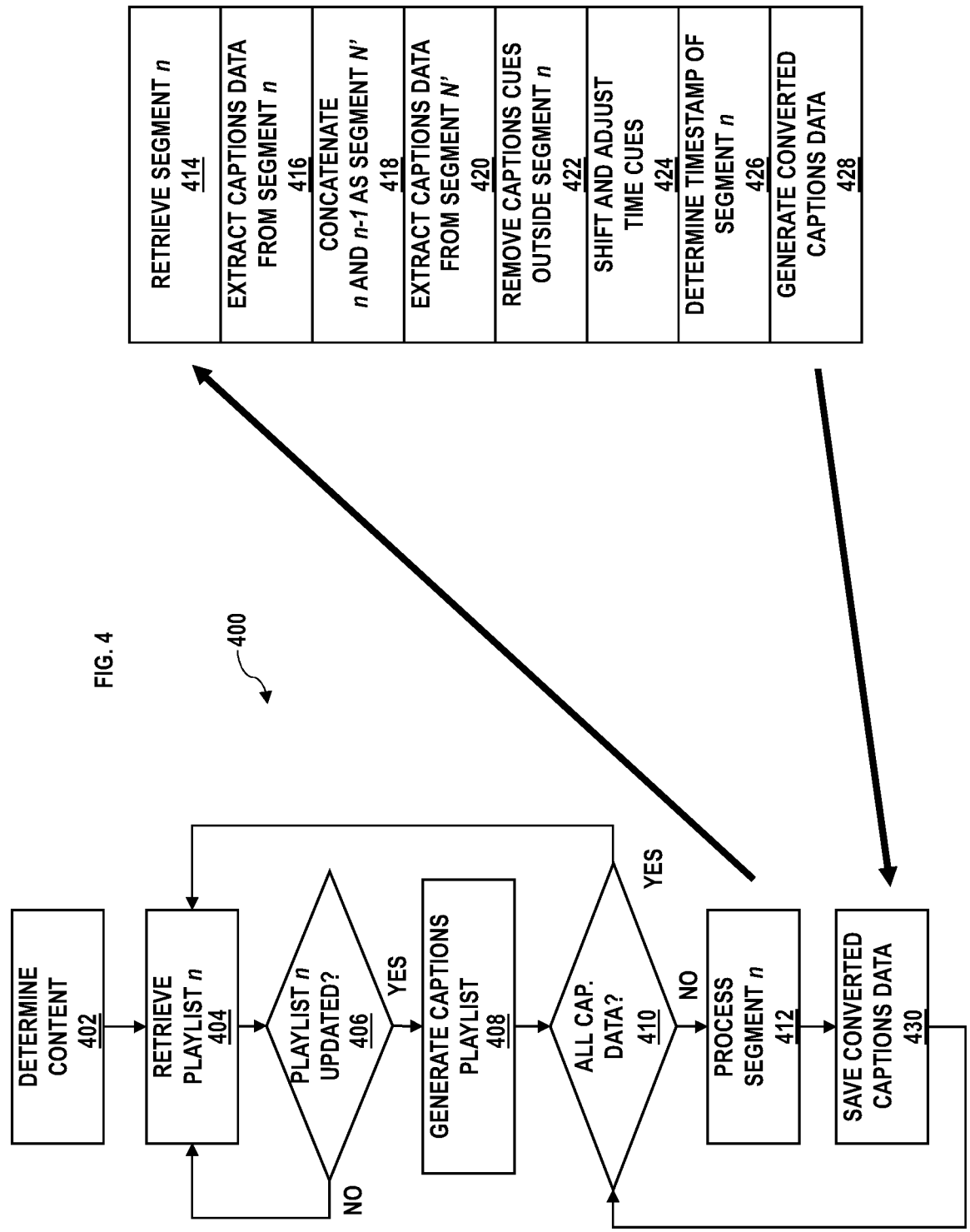
FIG. 4 shows a flowchart of an example method.

FIG. 4 shows a flowchart of an example method 400 for captions data conversion. The method 400 may be performed in whole or in part by the computing device 110A, 110B and/or the captions device 111. For example, as further described herein, the method 400 may include steps that are performed by the captions device 111 when implementing the sliding window/lookback process described above with respect to FIGS. 3A-3C. At step 402, content associated with a request may be determined. For example, the computing device 190 may send a request for a portion of the content (e.g., stream, segment, fragment, etc.) at a first bitrate, and the computing device 110A,110B and/or the captions device 111 may determine the particular portion of the content associated with the request and a representation of the content at the first bitrate. At step 404, playlist n may be retrieved. The playlist n may be associated with the content determined at step 402. For example, the playlist n may comprise a variant playlist (e.g., variant playlist 204A) associated with the representation of the content at the first bitrate or at another bitrate. The playlist n may comprise a plurality of segments of the content (e.g., segments 207). For example, the playlist n may a comprise listing of a plurality of segments of the content for a lowest-resolution/lowest-bitrate representation of the content (e.g., the low bitrate variant 204).

At step 406, the computing device 110A,110B and/or the captions device 111 may determine whether the playlist n has been updated. For example, the computing device 110A, 110B and/or the captions device 111 may determine whether new segments of the content have been encoded (e.g., as a live/linear content item is encoded in real-time) and added to the playlist n since a last time that the method 400 was performed and corresponding captions data were converted (e.g., based on a prior request). If the computing device 110A,110B and/or the captions device 111 determines that new segments of the content have not been encoded, then the request for content may be processed using captions data indicated by the playlist n (e.g., captions data generated the last time the method 400 was performed). However, if the computing device 110A,110B and/or the captions device 111 determines that new segments of the content have been encoded, the method 400 may proceed to step 408 and embedded captions data associated with the new segments of the content may be processed by the method 400 as described herein.

At step 408, a captions playlist may be generated. For example, the captions playlist generated at step 408 may comprise a playlist file (or a portion(s) thereof), a side-car file, a WebVTT manifest file and/or index, a combination thereof, and/or the like. The captions playlist generated at step 408 may be populated with converted captions data for the new segments of the content as the method 400 proceeds to step 430. As further described herein, the playlist n may be updated to include the captions playlist generated at step 408 (or data indicative thereof).

At step 410, the computing device 110A,110B and/or the captions device 111 may determine whether all relevant captions data for the new segments of the content have been processed. For example, the new segments of the content may not comprise any embedded captions data that requires processing by the method 400 (e.g., a scene(s) of the content without any closed captioning/subtitles). If the computing device 110A,110B and/or the captions device 111 determines that all relevant captions data for the new segments of the content have been processed (or that the new segments do not comprise any embedded captions data for processing), then the method 400 may return to step 404 and the request may be processed using captions data indicated by the playlist n (e.g., captions data generated the last time the method 400 was performed). However, if the computing device 110A,110B and/or the captions device 111 determines that new captions data for the new segments of the content need to be processed, then the method 400 may proceed to step 412.

Step 412, as shown in FIG. 4, may comprise a series of steps 414-428. At step 414, a new segment n of the content may be processed. The new segment n may be identified/listed in the playlist n and determined/identified as a new segment requiring processing by the method 400 at step 406. For example, FIG. 5A shows an example of how the playlist n may list new segments of the content. The new segment n may be identified by a sequence number 501 (e.g., "302619").

Conversion of the embedded captions data for the new segment n may use a sliding window and/or lookback process as described herein with respect to FIGS. 3A-3C. For example, the embedded captions data for the new segment n may be processed using the sliding window and/or lookback process to capture captions data for any captions element(s) that may overlap the new segment n and one or more adjacent segments. At step 416, captions data for the new segment n may be extracted from the embedded captions data. The extracted captions data may comprise a playlist file/portion, a side-car file/portion, a WebVTT file/portion, etc., such as the captions data shown in FIG. 5B. The extracted captions data may comprise corresponding captions data for a captions element(s) associated with the new segment n, such as captions identifiers, as well as timing data for the new segment n. FIG. 6A shows an example of the captions data extracted from the new segment n. As shown in FIG. 6A, the captions data extracted from the new segment n may comprise timing data 600A, caption cues 602A indicative of a beginning time code and an ending time code of a first captions element, and caption cues 602B indicative of a beginning time code and an ending time code of a second captions element within the new segment n. The timing data 600A may comprise or indicate a start position/start time of the new segment n in a source stream of the content (e.g., the source stream 102). For example, the timing data 600A may comprise a presentation timestamp (PTS) value that relates a time that the segment n was encoded and/or transcoded (e.g., by the encoder 120) to a beginning of the particular content item.

At step 418, new segment n may be concatenated with an adjacent segment n−1 (e.g., a prior segment). A result of the concatenation may be referred to herein as segment N'. At step 420, combined captions data may be extracted from the segment N'. The extracted combined captions data may comprise a playlist file/portion, a side-car file/portion, a WebVTT file/portion, etc. The extracted combined captions data may comprise captions data, such as captions identifiers and timing data, for the captions element(s) associated with the new segment n and the adjacent segment n−1 (e.g., an overlapping captions element(s)). For example, as shown in FIG. 6B, the extracted combined captions may comprise timing data 600B, caption cues 601A-601C indicative of corresponding beginning time codes and ending time codes of three captions elements associated with the adjacent segment, and caption cues 603A and 603B indicative of corresponding beginning time codes and ending time codes of the captions elements associated with the new segment n. The caption cues 603A and 603B may correspond to the caption cues 602A and 602B, except the beginning time codes and ending time codes of the captions elements may differ due to the concatenation performed to generate the segment N'. For example, the new segment n may comprise a duration of 6 seconds, and the segment N' may comprise a duration of 12 seconds (e.g., 6 seconds of the adjacent segment plus the 6 seconds of the segment n). The timing data 600B may comprise or indicate a start position/start time of the adjacent segment n−1 in the source stream of the content (e.g., the source stream 102) For example, the timing data 600B may comprise a PTS value that relates a time that the adjacent segment was encoded and/or transcoded (e.g., by the encoder 120) to a beginning of the content item.

While the segment n is described herein as being a segment that sequentially follows the adjacent segment n−1, it is to be understood that the adjacent segment n−1 may—or may not—directly precede the segment n. For example, the adjacent segment may be segment "n−m", where m represents a value greater than 1. Other examples are possible as well.

At step 422, caption cues not associated with the new segment n (e.g., those having time codes occurring outside the segment n) may be removed from the segment N'. The computing device 110A,110B and/or the captions device 111 may determine a captions element(s) to remove from the segment N' based on a duration of the adjacent segment n−1 (e.g., 6 seconds) and the ending time code for each of the captions elements in the segment N'. For example, the adjacent segment n−1 may comprise a duration of 6 seconds, and captions element(s) having an ending time code that is less than "6" may be removed from the segment N'. As shown in FIG. 6B, the caption cues 601A indicate the first captions element in the segment N' comprises an ending time code of "00:00:04.199," while the second and further captions elements in the segment N' comprise ending time codes greater than "6." As a result, the first captions element in the segment N' may be removed and the second and further captions elements in the segment N' may not be removed.

At step 424, the beginning and ending time codes of the remaining captions elements in the segment N' may be adjusted. For example, the duration of the adjacent segment n−1 (e.g., 6 seconds) may be subtracted from the beginning and ending time codes of the remaining captions elements in the segment N'. Any resulting timecode that is less than a specified value (e.g., 00:00:00.010) may be adjusted to the specified value (e.g., 00:00:00.010). For example, the caption cues 601B indicate the second captions element in the segment N', after subtracting the duration of the adjacent segment n−1, results in a beginning timecode having a negative value. The beginning timecode for the second captions element in the segment N' may be adjusted to the specified value (e.g., 00:00:00.010), and the ending timecode for the second captions element in the segment N' may be adjusted to a value of 6 minus 00:00:00:06.432 (e.g., 00:00:00:00.432) as indicated by caption cues 604A in FIG. 6C.

At step 426, a timestamp of the segment n may be determined. The timestamp of the segment n may comprise the PTS indicated by the timing data 600A. At step 428, converted captions data for the segment n may be generated. The converted captions data may comprise a remaining portion of the combined captions data extracted from the segment N' after the caption cues not associated with the new segment n are removed from the segment N' at step 422. When generating the converted captions data for the segment n, the remaining portion of the combined captions data may be combined with the captions data that was extracted from the new segment n at step 416 (e.g., the playlist file/portion, side-car file/portion, WebVTT file/portion, etc.). FIG. 6C shows an example of the converted captions data for the segment n. As shown in FIG. 6C, the converted captions data may comprise the timing data 600A indicating the start position/start time of the new segment n in the source stream of the content. The converted captions data may comprise caption cues 604A-604D. The caption cues 604A and 604B may indicate beginning and ending time codes of the second and third captions elements from the segment N', which may be including in the converted captions data for the segment n as a result of the sliding window and/or lookback process performed at steps 414-428. The caption cues 604C and 604D may indicate beginning and ending time codes of the fourth and fifth captions elements from the segment N', which correspond to the first and second captions elements 602A and 602B. The converted captions data for the segment n may comprise all relevant captions data associated with the new segment n, including any captions element(s) that overlap the new segment n and the adjacent segment n−1 (e.g., as indicated by the caption cues 604A and 604B).

At step 430, the converted captions data may be saved in the captions playlist generated at step 408. For example, the computing device 110A,110B and/or the captions device 111 may add a reference to (or directly append) the playlist n, a corresponding master playlist, and/or a plurality of other variant playlists. The method 400 may then return to step 410, and the computing device 110A,110B and/or the captions device 111 may determine whether all relevant captions data any other new segments of the content have been processed and proceed accordingly (to process other new segments) or return step 404 and process the request (if all relevant captions data has been processed).

As discussed herein, the converted captions data may comprise the timing data 600A (e.g., the PTS) indicating the start position/start time of the new segment n in the source stream of the content. As a result, the converted captions data may be in synch with the segment n based on the timing data 600A (e.g., the PTS). The synchronization between the converted captions data and the segment n may be independent of other segments of the source stream. For example, the synchronization between the converted captions data and the segment n may not be impacted by adjacent (e.g., neighboring) segments as a result of the timing data 600A (e.g., the PTS) being used for such synchronization. This may allow, as an example, for an additional segment(s) to be inserted into the source stream of the content before or after the segment n while maintaining synchronization between the segment n and the converted captions data. The additional segment(s) may comprise, for example, an advertisement/commercial, an alert message (e.g., an emergency alert system message), a weather report, a news report, a combination thereof, and/or the like. The additional segment(s) may comprise video, audio, text, or a combination thereof. The additional segment(s) of may be inserted into the source stream of the content before or after the segment n by adding a reference to (or directly appending) the playlist n, a corresponding master playlist, and/or a plurality of other variant playlists. For example, the playlist n, a corresponding master playlist, and/or a plurality of other variant playlists that list the segment n may be modified to include timing data for the additional segment(s) (e.g., identified by a sequence number 501). The timing data for the additional segment(s) may indicate a start position/start time of the additional segment(s) with respect to a beginning or an ending of the first segment in the source stream of the content. For example, the start position/start time of the additional segment(s) may be less than or greater than the start position/start time of the first segment depending on whether the additional segment(s) is to precede or follow the first segment in the source stream.

In some scenarios, there may be a discontinuity between timing data for an existing segment(s) (e.g., segment n) and the timing data for the additional segment(s). The discontinuity (or discontinuities) may be indicated in the playlist n, a corresponding master playlist, and/or a plurality of other variant playlists. A first tag (e.g., an XML tag; manifest/playlist tag; etc.) such an "EXT-X-DISCONTINUITY" tag may be added to the playlist n, a corresponding master playlist, and/or a plurality of other variant playlists. A second tag (e.g., an XML tag; manifest/playlist tag; etc.) such an "EXT-X-DISCONTINUITY-SEQUENCE" tag may be added to the playlist n, a corresponding master playlist, and/or a plurality of other variant playlists to track a cumulative number of discontinuities between the timing data for the existing segment(s) (e.g., segment n) and the timing data for the additional segment(s). Other tag configurations are possible as well.

Figure 7:
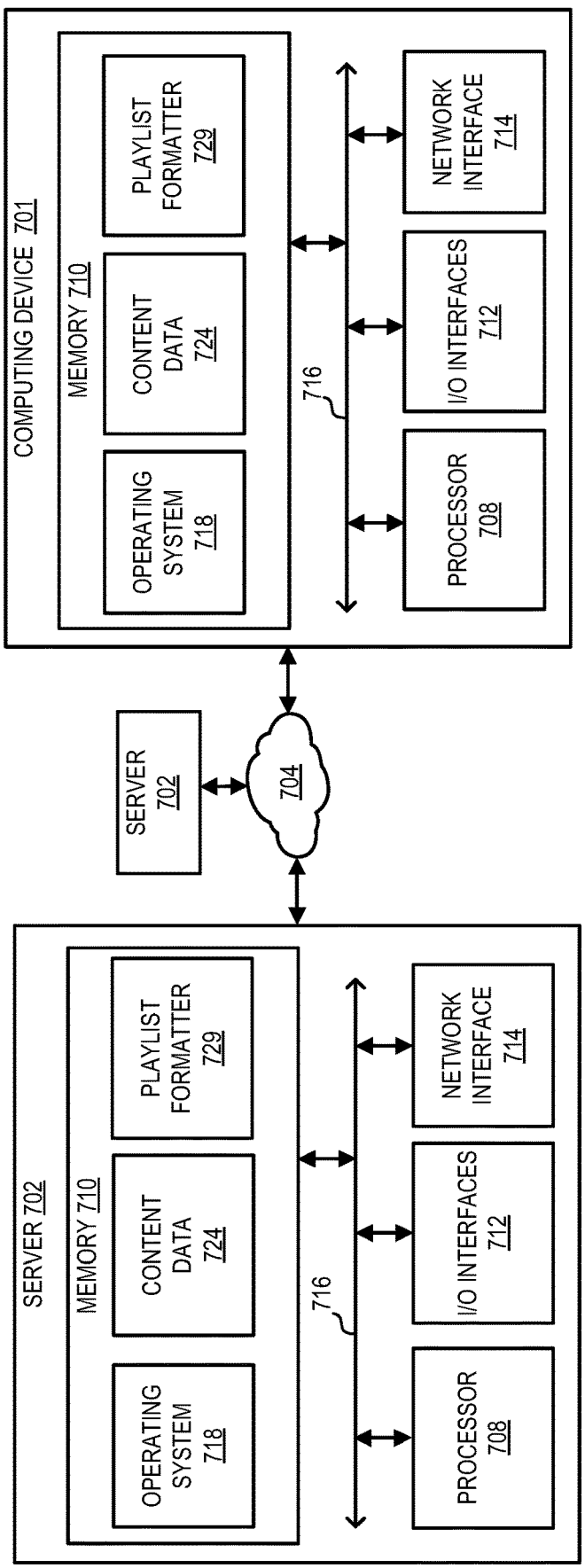
FIG. 7 shows an example system.

The present methods and systems may be computer-implemented. FIG. 7 shows a block diagram depicting a system/environment 700 comprising non-limiting examples of a computing device 701 and a server 702 connected through a network 704. Either of the computing device 701 or the server 702 may be a computing device, such as any of the computing devices 110A, 110B, the captions device 111, or the computing device 190 of the system 100 shown in FIG. 1. In an aspect, some or all steps of any described method may be performed on a computing device as described herein. The computing device 701 may comprise one or multiple computers configured to store one or more of a playlist formatter 729, and/or the like. The server 702 may comprise one or multiple computers configured to store content data 724 (e.g., a plurality of content segments). Multiple servers 702 may communicate with the computing device 701 via the through the network 704.

The computing device 701 and the server 702 may be a digital computer that, in terms of hardware architecture, generally includes a processor 708, system memory 710, input/output (I/O) interfaces 712, and network interfaces 714. These components (708, 710, 712, and 714) are communicatively coupled via a local interface 716. The local interface 716 may be, for example, but not limited to, one or more buses or other wired or wireless connections, as is known in the art. The local interface 716 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 708 may be a hardware device for executing software, particularly that stored in system memory 710. The processor 708 may be any custom made or commercially available processor, a central processing unit (CPU), an auxiliary processor among several processors associated with the computing device 701 and the server 702, a semiconductor-based microprocessor (in the form of a microchip or chip set), or generally any device for executing software instructions. During operation of the computing device 701 and/or the server 702, the processor 708 may execute software stored within the system memory 710, to communicate data to and from the system memory 710, and to generally control operations of the computing device 701 and the server 702 pursuant to the software.

The I/O interfaces 712 may be used to receive user input from, and/or for sending system output to, one or more devices or components. User input may be received via, for example, a keyboard and/or a mouse. System output may be output via a display device and a printer (not shown). I/O interfaces 712 may include, for example, a serial port, a parallel port, a Small Computer System Interface (SCSI), an infrared (IR) interface, a radio frequency (RF) interface, and/or a universal serial bus (USB) interface.

The network interface 714 may be used to transmit and receive from the computing device 701 and/or the server 702 on the network 704. The network interface 714 may include, for example, a 10BaseT Ethernet Adaptor, a 10BaseT Ethernet Adaptor, a LAN PHY Ethernet Adaptor, a Token Ring Adaptor, a wireless network adapter (e.g., WiFi, cellular, satellite), or any other suitable network interface device. The network interface 714 may include address, control, and/or data connections to enable appropriate communications on the network 704.

The system memory 710 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the system memory 710 may incorporate electronic, magnetic, optical, and/or other types of storage media. Note that the system memory 710 may have a distributed architecture, where various components are situated remote from one another, but may be accessed by the processor 708.

The software in system memory 710 may include one or more software programs, each of which comprises an ordered listing of executable instructions for implementing logical functions. In the example of FIG. 7, the software in the system memory 710 of the computing device 701 may comprise the playlist formatter 729, the content data 724, and a suitable operating system (O/S) 718. In the example of FIG. 7, the software in the system memory 710 of the server 702 may comprise the playlist formatter 729, the content data 724, and a suitable operating system (O/S) 718. The operating system 718 essentially controls the execution of other computer programs and enables scheduling, input-output control, file and data management, memory management, and communication control and related services.

For purposes of illustration, application programs and other executable program components such as the operating system 718 are shown herein as discrete blocks, although it is recognized that such programs and components may reside at various times in different storage components of the computing device 701 and/or the server 702. An implementation of the system/environment 700 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Figure 8:
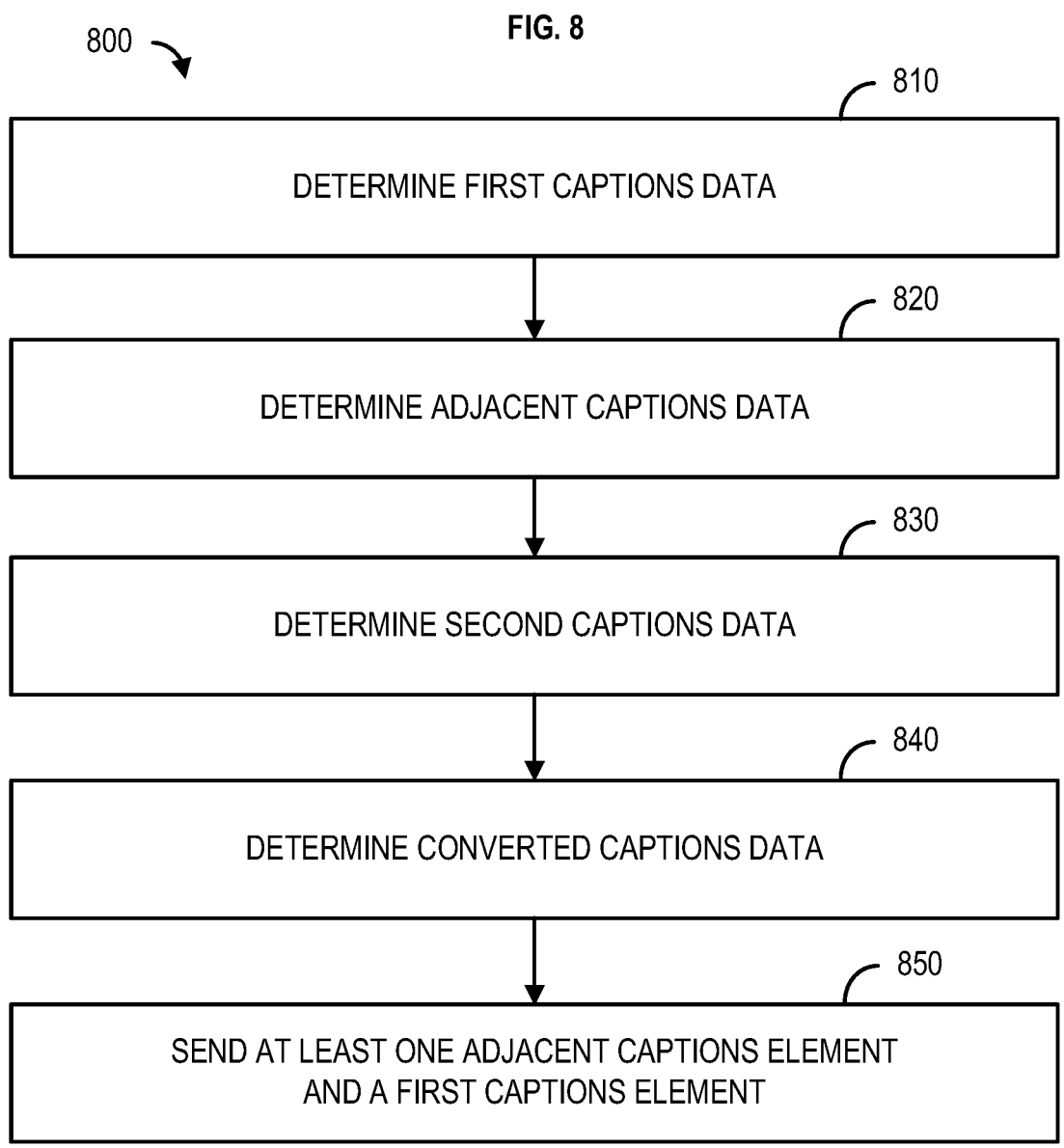
FIG. 8 shows a flowchart for an example method.

FIG. 8 shows a flowchart of an example method 800 for captions data conversion. The method 800 may be performed in whole or in part by a single computing device, a plurality of computing devices, and the like. For example, the steps of the method 800 may be performed by the computing device 110A,110B, or the captions device 111 shown in FIG. 1. Some steps of the method 800 may be performed by one computing device, while other steps of the method 800 may be performed by another computing device.

A computing device may receive an encoded stream of a content item. The encoded stream may comprise, as an example, the source stream 102. The encoded stream may comprise a plurality of encoded segments of the content item at a plurality of representations (e.g., bitrates). The plurality of encoded segments may comprise embedded captions data (e.g., captions data in the CEA-608/EIA-708 format).

At step 810, the computing device may determine first captions data. For example, the computing device may determine the first captions data based on a first segment of the encoded stream. The first segment may comprise a segment of the content item at a first resolution/bitrate. For example, a master playlist associated with the content item may comprise a listing of a plurality of segments of the content item for a plurality of representations at a plurality of resolutions/bitrates. The first resolution/bitrate may comprise a lowest-resolution/lowest-bitrate representation of the content (e.g., the low bitrate variant 204). The first captions data may comprise captions identifiers associated with the first segment. The first captions data may comprises a first captions element associated with the first segment.

At step 820, the computing device may determine adjacent captions data. For example, the computing device may determine the adjacent captions data based on an adjacent segment (e.g., a prior segment) of the content item. The adjacent segment may precede the first segment. The adjacent captions data may comprise a plurality of adjacent captions elements. The plurality of adjacent captions elements may be associated with the adjacent segment and/or the first segment. For example, the plurality of adjacent captions elements may comprise one or more captions elements associated with both the adjacent segment and the first segment, such as a captions element(s) that "overlaps" both the adjacent segment and the first segment. At step 830, second captions data may be determined. The computing device may determine the second captions data based on the first segment and the adjacent segment. For example, the computing device may determine the second captions data based on a concatenation of the first segment and the adjacent segment. The computing device may determine a concatenated segment (e.g., the segment N' described herein) based on a concatenation of the first segment (e.g., the segment n) and the adjacent segment (e.g., the segment n−1). The computing device may extract the second captions data from the concatenated segment. The second captions data may comprise at least one adjacent captions element of the plurality of adjacent captions elements that is associated with the adjacent segment and the first segment (e.g., an "overlapping" captions element). The second captions data may comprise captions identifiers associated with the first segment and the adjacent segment. For example, the second captions data may comprise the first captions element and the plurality of adjacent captions elements. The adjacent segment and the first segment may be consecutive/sequential segments.

At step 840, converted captions data may be determined. The converted captions data may be associated with the first segment and the adjacent segment. The converted captions data may comprise the first captions element and at least one adjacent captions element of the plurality of adjacent captions elements. The computing device may determine the converted captions data based on the second captions data. For example, the computing device may determine the converted captions data by removing, from the second captions data, at least one portion of the at least one adjacent captions element associated with the adjacent segment. The at least one portion of the at least one adjacent captions element may be removed from the second captions data based on the captions identifiers and timing data associated with the first segment. The at least one portion of the at least one adjacent captions element may only be associated with the adjacent segment (e.g., a portion of an overlapping captions element(s) associated with the adjacent segment only). Based on the second captions data and the timing data, the computing device may determine the converted captions data.

At step 850, the computing device may send the at least one adjacent captions element and the first captions element (e.g., the converted captions data). For example, the computing device may send the at least one adjacent captions element and the first captions element to a user device (e.g., the computing device 190) for presentation (e.g., output) with the first segment. The computing device may send the at least one adjacent captions element and the first captions element to a caching device (e.g., an edge cache, a mid-tier cache, a cloud cache, etc.). The converted captions data may be determined/generated based on a computing device type or a user device type to ensure compatibility. For example, the converted captions data may be determined/generated according to the WebVTT format based on the user device being compatible with the WebVTT format (e.g., versus the CEA-608/EIA-708 format).

The converted captions data may be used to generate a playlist file (or a portion(s) thereof), a side-car file, a WebVTT manifest file and/or index, a combination thereof, and/or the like. For example, the computing device may generate a modified version of the master playlist (or a variant playlist) by inserting the converted captions data therein. The computing device may add a reference to (or directly append) the master playlist and/or a variant playlist(s) when inserting the converted captions data. The modified version of the master playlist (or variant playlist) may be used to process requests for the first segment of the content item, regardless of the representation (e.g., resolution/bitrate.

The converted captions data may comprise the timing data associated with the first segment. The timing data may indicate a start position/start time of the first segment in the encoded stream of the content. As a result, the converted captions data may be in synch with the first segment based on the timing data (e.g., a PTS). The synchronization between the converted captions data and the first segment may be independent of other segments of the encoded stream. For example, the synchronization between the converted captions data and the first segment may not be impacted by adjacent (e.g., neighboring) segments as a result of the timing data being used for such synchronization. This may allow, as an example, for an additional segment(s) to be inserted into the encoded stream of the content before or after the first segment while maintaining synchronization between the first segment and the converted captions data. The additional segment(s) may comprise, for example, an advertisement/commercial, an alert message (e.g., an emergency alert system message), a weather report, a news report, a combination thereof, and/or the like. The additional segment(s) may comprise video, audio, text, or a combination thereof. The additional segment(s) of may be inserted into the encoded stream of the content before or after the first segment by adding a reference to (or directly appending) a playlist associated with the encoded stream and the first segment (e.g., a corresponding master playlist, a plurality of other variant playlists, etc.). For example, the playlist associated with the encoded stream and the first segment may be modified to include timing data for the additional segment(s) (e.g., identified by a sequence number 501). The timing data for the additional segment(s) may indicate a start position/start time of the additional segment(s) with respect to a beginning or an ending of the first segment in the encoded stream. For example, the start position/start time of the additional segment(s) may be less than or greater than the start position/start time of the first segment depending on whether the additional segment(s) is to precede or follow the first segment in the encoded stream.

Figure 9:
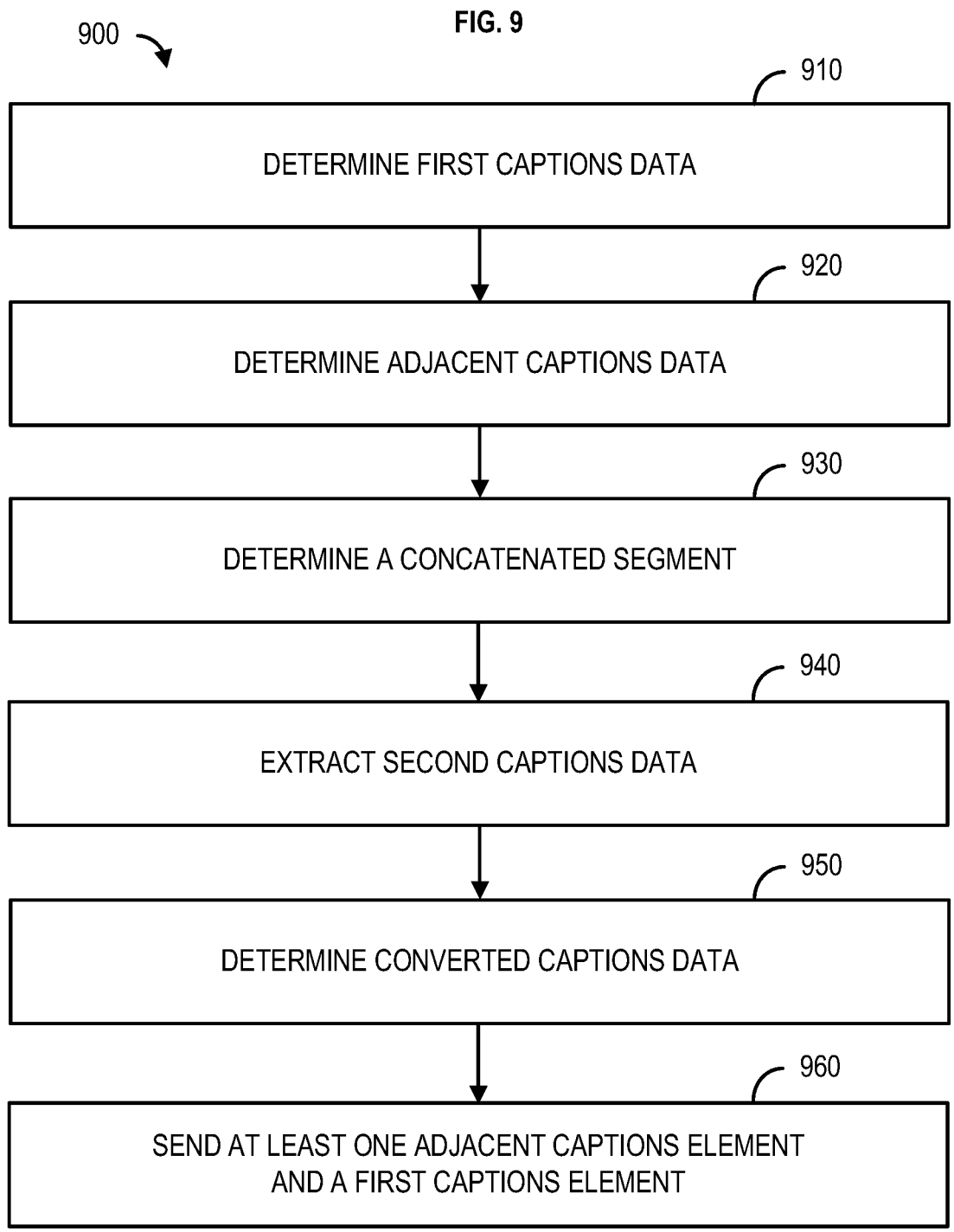
FIG. 9 shows a flowchart for an example method.

FIG. 9 shows a flowchart of an example method 900 for captions data conversion. The method 900 may be performed in whole or in part by a single computing device, a plurality of computing devices, and the like. For example, the steps of the method 900 may be performed by the computing device 110A,110B, or the captions device 111 shown in FIG. 1. Some steps of the method 900 may be performed by one computing device, while other steps of the method 900 may be performed by another computing device.

A computing device may receive an encoded stream of a content item. The encoded stream may comprise, as an example, the source stream 102. The encoded stream may comprise a plurality of encoded segments of the content item at a plurality of representations (e.g., bitrates). The plurality of encoded segments may comprise embedded captions data (e.g., captions data in the CEA-608/EIA-708 format).

At step 910, the computing device may determine first captions data. For example, the computing device may determine the first captions data based on a first segment of the encoded stream. The first segment may comprise a segment of the content item at a first resolution/bitrate. For example, a master playlist associated with the content item may comprise a listing of a plurality of segments of the content item for a plurality of representations at a plurality of resolutions/bitrates. The first resolution/bitrate may comprise a lowest-resolution/lowest-bitrate representation of the content (e.g., the low bitrate variant 204). The first captions data may comprise captions identifiers and/or a first captions element associated with the first segment.

At step 920, the computing device may determine adjacent captions data. For example, the computing device may determine the adjacent captions data based on an adjacent segment (e.g., a prior segment) of the content item. The adjacent segment may precede the first segment. The adjacent captions data may comprise a plurality of adjacent captions elements. The plurality of adjacent captions elements may be associated with the adjacent segment and/or the first segment. For example, the plurality of adjacent captions elements may comprise one or more captions elements associated with both the adjacent segment and the first segment, such as a captions element(s) that "overlaps" both the adjacent segment and the first segment. The computing device may determine second captions data. The computing device may determine the second captions data based on a concatenation of the first segment and the adjacent segment (e.g., a prior segment) of the first encoded stream. For example, at step 930, the computing device may determine a concatenated segment (e.g., the segment N' described herein). The computing device may determine the concatenated segment based on a concatenation of the first segment (e.g., the segment n) and the adjacent segment (e.g., the segment n−1). At step 940, the computing device may extract the second captions data. For example, the computing device may extract the second captions data from the concatenated segment. The second captions data may comprise at least one adjacent captions element of the plurality of adjacent captions elements that is associated with the adjacent segment and the first segment (e.g., an "overlapping" captions element). The second captions data may comprise captions identifiers associated with the first segment and the adjacent segment. For example, the second captions data may comprise the first captions element and the plurality of adjacent captions elements. The adjacent segment and the first segment may be consecutive/sequential segments.

At step 950, converted captions data may be determined. The converted captions data may comprise the first captions element and the at least one adjacent captions element. The converted captions data may be associated with the first segment and the adjacent segment. For example, the computing device may determine the converted captions data by removing at least one portion of the at least one adjacent captions element from the second captions data. The at least one portion of the at least one adjacent captions element may be removed from the second captions data based on the captions identifiers and timing data associated with the first segment. The at least one portion of the at least one adjacent captions element may only be associated with the adjacent segment (e.g., a portion of an overlapping captions element(s) associated with the adjacent segment only). Based on the second captions data and the timing data, the computing device may determine the converted captions data.

At step 960, the computing device may send the at least one adjacent captions element and the first captions element (e.g., the converted captions data). For example, the computing device may send the at least one adjacent captions element and the first captions element to a user device (e.g., the computing device 190) for presentation (e.g., output) with the first segment. The computing device may send the converted captions data to a caching device (e.g., an edge cache, a mid-tier cache, a cloud cache, etc.). The converted captions data may be determined/generated based on a computing device type or a user device type to ensure compatibility. For example, the converted captions data may be determined/generated according to the WebVTT format based on the user device being compatible with the WebVTT format (e.g., versus the CEA-608/EIA-708 format).

The converted captions data may be used to generate a playlist file (or a portion(s) thereof), a side-car file, a WebVTT manifest file and/or index, a combination thereof, and/or the like. For example, the computing device may generate a modified version of the master playlist (or a variant playlist) by inserting the converted captions data therein. The computing device may add a reference to (or directly append) the master playlist and/or a variant playlist (s) when inserting the converted captions data. The modified version of the master playlist (or variant playlist) may be used to process requests for the first segment of the content item, regardless of the representation (e.g., resolution/bitrate.

The converted captions data may comprise the timing data associated with the first segment. The timing data may indicate a start position/start time of the first segment in the encoded stream of the content. As a result, the converted captions data may be in synch with the first segment based on the timing data (e.g., a PTS). The synchronization between the converted captions data and the first segment may be independent of other segments of the encoded stream. For example, the synchronization between the converted captions data and the first segment may not be impacted by adjacent (e.g., neighboring) segments as a result of the timing data being used for such synchronization. This may allow, as an example, for an additional segment(s) to be inserted into the encoded stream of the content before or after the first segment while maintaining synchronization between the first segment and the converted captions data. The additional segment(s) may comprise, for example, an advertisement/commercial, an alert message (e.g., an emergency alert system message), a weather report, a news report, a combination thereof, and/or the like. The additional segment(s) may comprise video, audio, text, or a combination thereof. The additional segment(s) of may be inserted into the encoded stream of the content before or after the first segment by adding a reference to (or directly appending) a playlist associated with the encoded stream and the first segment (e.g., a corresponding master playlist, a plurality of other variant playlists, etc.). For example, the playlist associated with the encoded stream and the first segment may be modified to include timing data for the additional segment(s) (e.g., identified by a sequence number 501). The timing data for the additional segment(s) may indicate a start position/start time of the additional segment (s) with respect to a beginning or an ending of the first segment in the encoded stream. For example, the start position/start time of the additional segment(s) may be less than or greater than the start position/start time of the first segment depending on whether the additional segment(s) is to precede or follow the first segment in the encoded stream.

FIG. 10 shows a flowchart of an example method 1000 for captions data conversion. The method 1000 may be performed in whole or in part by a single computing device, a plurality of computing devices, and the like. For example, the steps of the method 1000 may be performed by the computing device 110A,110B, or the captions device 111 shown in FIG. 1. Some steps of the method 900 may be performed by one computing device, while other steps of the method 1000 may be performed by another computing device.

A computing device may receive an encoded stream of a content item. The encoded stream may comprise, as an example, the source stream 102. The encoded stream may comprise a plurality of encoded segments of the content item at a plurality of representations (e.g., bitrates). The plurality of encoded segments may comprise embedded captions data (e.g., captions data in the CEA-608/EIA-708 format).

At step 1010, the computing device may determine a first segment and an adjacent segment of the content item. The adjacent segment may comprise a segment of the content item that precedes the first segment. The first segment may be associated with first captions data. For example, the computing device may determine the first captions data based on the first segment. The first segment may comprise a segment of the content item at a first resolution/bitrate. For example, a master playlist associated with the content item may comprise a listing of a plurality of segments of the content item for a plurality of representations at a plurality of resolutions/bitrates. The first resolution/bitrate may comprise a lowest-resolution/lowest-bitrate representation of the content (e.g., the low bitrate variant 204). The first captions data may comprise captions identifiers associated with the first segment. The first segment may be associated with first timing data. The first timing data may comprise or indicate a start position/start time of the first segment and an end position/end time of the first segment in the encoded stream. For example, the first timing data for the first segment may comprise presentation timestamp (PTS) values that relate a time that the first segment was encoded and/or transcoded (e.g., by the encoder 120) to a beginning of the particular content item.

At step 1020, the computing device may determine captions data. The computing device may determine the captions data based on the first segment and the adjacent segment. The captions data may comprise first captions identifiers associated with the first timing data and adjacent captions identifiers associated with adjacent timing data. The adjacent timing data may be associated with the adjacent segment. The computing device may determine the captions data based on a concatenation of the first segment and the adjacent segment (e.g., a prior segment). For example, the computing device may determine a concatenated segment (e.g., the segment N' described herein). The computing device may determine the concatenated segment based on a concatenation of the first segment (e.g., the segment n) and the adjacent segment (e.g., the segment n−1). The adjacent timing data may comprise or indicate a start position/start time of the adjacent segment and an end position/end time of the adjacent segment in the encoded stream. For example, the adjacent timing data for the adjacent segment may comprise PTS values that relate a time that the adjacent segment was encoded and/or transcoded (e.g., by the encoder 120) to a beginning of the content item. The first timing data and the adjacent timing data may comprise sequential PTS values.

The computing device may extract the captions data. For example, the computing device may extract the captions data from the concatenated segment. The captions data may comprise at least one captions element associated with the adjacent segment and the first segment (e.g., an "overlapping" captions element) and captions identifiers associated with the first segment and the adjacent segment. The adjacent segment and the first segment may be consecutive/sequential segments.

At step 1030, the computing device may determine at least one captions element associated with the adjacent segment. For example, the computing device may determine the at least one captions element associated with the adjacent segment based on the first captions identifiers and the adjacent captions identifiers. The adjacent captions identifiers may be associated with the at least one portion of the at least one captions element (e.g., a sentence, phrase, etc.) that overlaps the adjacent segment and the first segment.

At step 1040, the computing device may cause the at least one captions element to be excluded from converted captions data. For example, the computing device may cause the at least one captions element to be excluded from the converted captions data based on the at least one captions element—or a portion thereof—being associated with the adjacent segment only (e.g., an overlapping captions element(s) associated with the adjacent segment only). The computing device may determine the converted captions data based on the captions data and the at least one portion of the captions element. The converted captions data may be associated with the first segment and the adjacent segment. For example, the computing device may determine the converted captions data by removing at least one portion of the at least one captions element from the captions data. The at least one portion of the at least one captions element may be removed from the captions data based on the first captions identifiers, the adjacent captions identifiers, the first timing data, and the adjacent timing data. For example, the at least one portion of the at least one captions element may be removed from the captions data by subtracting a duration of the adjacent segment from corresponding captions identifiers (e.g., based on the first captions identifiers and the adjacent captions identifiers) of the at least one portion of the at least one captions element. The converted captions data may comprise a remaining portion of the captions data after the at least one portion of the at least one captions element is removed (e.g., as in steps 422 and 424 of the method 400).

The computing device may send the converted captions data. For example, the computing device may send and the converted captions data to a caching device (e.g., an edge cache, a mid-tier cache, a cloud cache, etc.) and/or to a user device (e.g., the computing device 190). The converted captions data may cause the user device to output at least one other captions element associated with the adjacent segment. For example, the converted captions data may cause the user device to output the at least one other captions element associated with the adjacent segment during output of the first segment. The at least one other captions element associated with the adjacent segment may comprise an overlapping captions element associated with the adjacent segment as well as the first segment. As discussed herein, the computing device may determine the converted captions data by removing at least one portion of the at least one captions element from the captions data. The at least one other captions element that is output with the first segment may comprise a remaining captions element(s) of the at least one captions element. The remaining captions element(s) may comprise a remainder of the at least one captions element following the removal of the at least one portion, which may comprise a portion that is only associated with the adjacent segment. The remaining captions element(s) may be associated with first segment as well as the adjacent segment.

The converted captions data may be determined/generated based on a computing device type or a user device type to ensure compatibility. For example, the converted captions data may be determined/generated according to the WebVTT format based on the user device being compatible with the WebVTT format (e.g., versus the CEA-608/EIA-708 format). The converted captions data may be used to generate a playlist file (or a portion(s) thereof), a side-car file, a WebVTT manifest file and/or index, a combination thereof, and/or the like. For example, the computing device may generate a modified version of the master playlist (or a variant playlist) by inserting the converted captions data therein. The computing device may add a reference to (or directly append) the master playlist and/or a variant playlist(s) when inserting the converted captions data. The modified version of the master playlist (or variant playlist) may be used to process requests for the first segment of the content item, regardless of the representation (e.g., resolution/bitrate.

The converted captions data may comprise the first timing data associated with the first segment. The first timing data may indicate a start position/start time of the first segment in the encoded stream of the content. As a result, the converted captions data may be in synch with the first segment based on the timing data (e.g., a PTS). The synchronization between the converted captions data and the first segment may be independent of other segments of the encoded stream. For example, the synchronization between the converted captions data and the first segment may not be impacted by adjacent (e.g., neighboring) segments as a result of the timing data being used for such synchronization. This may allow, as an example, for an additional segment(s) to be inserted into the encoded stream of the content before or after the first segment while maintaining synchronization between the first segment and the converted captions data. The additional segment(s) may comprise, for example, an advertisement/commercial, an alert message (e.g., an emergency alert system message), a weather report, a news report, a combination thereof, and/or the like. The additional segment(s) may comprise video, audio, text, or a combination thereof. The additional segment(s) of may be inserted into the encoded stream of the content before or after the first segment by adding a reference to (or directly appending) a playlist associated with the encoded stream and the first segment (e.g., a corresponding master playlist, a plurality of other variant playlists, etc.). For example, the playlist associated with the encoded stream and the first segment may be modified to include timing data for the additional segment(s) (e.g., identified by a sequence number 501). The timing data for the additional segment(s) may indicate a start position/start time of the additional segment(s) with respect to a beginning or an ending of the first segment in the encoded stream. For example, the start position/start time of the additional segment(s) may be less than or greater than the start position/start time of the first segment depending on whether the additional segment(s) is to precede or follow the first segment in the encoded stream.

FIG. 11 shows a flowchart of an example method 1100 for captions data conversion. The method 1100 may be performed in whole or in part by a single computing device, a plurality of computing devices, and the like. For example, the steps of the method 1100 may be performed by a user device, such as the computing device 190 shown in FIG. 1.

A computing device may receive an encoded stream of a content item. The encoded stream may comprise, as an example, the source stream 102. The encoded stream may comprise a plurality of encoded segments of the content item at a plurality of representations (e.g., bitrates). The plurality of encoded segments may comprise embedded captions data (e.g., captions data in the CEA-608/EIA-708 format).

At step 1110, the computing device may determine first captions data. For example, the computing device may determine the first captions data based on a first segment of the encoded stream. The first segment may comprise a segment of the content item at a first resolution/bitrate. For example, a master playlist associated with the content item may comprise a listing of a plurality of segments of the content item for a plurality of representations at a plurality of resolutions/bitrates. The first resolution/bitrate may comprise a lowest-resolution/lowest-bitrate representation of the content (e.g., the low bitrate variant 204). The first captions data may comprise captions identifiers associated with the first segment. The first captions data may comprises a first captions element associated with the first segment.

At step 1120, the computing device may determine adjacent captions data. For example, the computing device may determine the adjacent captions data based on an adjacent segment (e.g., a prior segment) of the content item. The adjacent segment may precede the first segment. The adjacent captions data may comprise a plurality of adjacent captions elements. The plurality of adjacent captions elements may be associated with the adjacent segment and/or the first segment. For example, the plurality of adjacent captions elements may comprise one or more captions elements associated with both the adjacent segment and the first segment, such as a captions element(s) that "overlaps" both the adjacent segment and the first segment.

At step 1130, second captions data may be determined. The computing device may determine the second captions data based on the first segment and the adjacent segment. For example, the computing device may determine the second captions data based on a concatenation of the first segment and the adjacent segment. The computing device may determine a concatenated segment (e.g., the segment N' described herein) based on a concatenation of the first segment (e.g., the segment n) and the adjacent segment (e.g., the segment n–1). The computing device may extract the second captions data from the concatenated segment. The second captions data may comprise at least one adjacent captions element of the plurality of adjacent captions elements that is associated with the adjacent segment and the first segment (e.g., an "overlapping" captions element). The second captions data may comprise captions identifiers associated with the first segment and the adjacent segment. For example, the second captions data may comprise the first captions element and the plurality of adjacent captions elements. The adjacent segment and the first segment may be consecutive/sequential segments.

At step 1140, converted captions data may be determined. The converted captions data may be associated with the first segment and the adjacent segment. The converted captions data may comprise the first captions element and at least one adjacent captions element of the plurality of adjacent captions elements. The computing device may determine the converted captions data based on the second captions data. For example, the computing device may determine the converted captions data by removing, from the second captions data, at least one portion of the at least one adjacent captions element associated with the adjacent segment. The at least one portion of the at least one adjacent captions element may be removed from the second captions data based on the captions identifiers and timing data associated with the first segment. The at least one portion of the at least one adjacent captions element may only be associated with the adjacent segment (e.g., a portion of an overlapping captions element(s) associated with the adjacent segment only). Based on the second captions data and the timing data, the computing device may determine the converted captions data.

At step 1150, the computing device may output the at least one adjacent captions element and the first captions element (e.g., the converted captions data). For example, the computing device may output the at least one adjacent captions element and the first captions element with the first segment.

The converted captions data may be determined/generated based on a device type associated with the computing device to ensure compatibility. For example, the converted captions data may be determined/generated according to the WebVTT format based on the computing device being compatible with the WebVTT format (e.g., versus the CEA-608/EIA-708 format).

The converted captions data may be used to generate a playlist file (or a portion(s) thereof), a side-car file, a WebVTT manifest file and/or index, a combination thereof, and/or the like. For example, the computing device may generate a modified version of the master playlist (or a variant playlist) by inserting the converted captions data therein. The computing device may add a reference to (or directly append) the master playlist and/or a variant playlist(s) when inserting the converted captions data. The modified version of the master playlist (or variant playlist) may be used to process requests for the first segment of the content item, regardless of the representation (e.g., resolution/bitrate).

The converted captions data may comprise the timing data associated with the first segment. The timing data may indicate a start position/start time of the first segment in the encoded stream of the content. As a result, the converted captions data may be in synch with the first segment based on the timing data (e.g., a PTS). The synchronization between the converted captions data and the first segment may be independent of other segments of the encoded stream. For example, the synchronization between the converted captions data and the first segment may not be impacted by adjacent (e.g., neighboring) segments as a result of the timing data being used for such synchronization. This may allow, as an example, for an additional segment(s) to be inserted into the encoded stream of the content before or after the first segment while maintaining synchronization between the first segment and the converted captions data. The additional segment(s) may comprise, for example, an advertisement/commercial, an alert message (e.g., an emergency alert system message), a weather report, a news report, a combination thereof, and/or the like. The additional segment(s) may comprise video, audio, text, or a combination thereof. The additional segment(s) of may be inserted into the encoded stream of the content before or after the first segment by adding a reference to (or directly appending) a playlist associated with the encoded stream and the first segment (e.g., a corresponding master playlist, a plurality of other variant playlists, etc.). For example, the playlist associated with the encoded stream and the first segment may be modified to include timing data for the additional segment(s) (e.g., identified by a sequence number 501). The timing data for the additional segment(s) may indicate a start position/start time of the additional segment(s) with respect to a beginning or an ending of the first segment in the encoded stream. For example, the start position/start time of the additional segment(s) may be less than or greater than the start position/start time of the first segment depending on whether the additional segment(s) is to precede or follow the first segment in the encoded stream.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. An apparatus comprising:
one or more processors; and
memory storing processor-executable instructions that, when executed by the one or more processors, cause the apparatus to:
determine, based on a first segment of a content item, first captions data comprising a first captions element;
determine, based on an adjacent segment of the content item, adjacent captions data comprising an adjacent captions element;
determine, based on the first segment and the adjacent segment, a concatenated segment;
extract, from the concatenated segment, second captions data, wherein the second captions data comprises the first captions element and the adjacent captions element;
determine, based on the second captions data, converted captions data, wherein the converted captions data comprises the first captions element and at least one portion of the adjacent captions element associated with the first segment, wherein the converted captions data excludes at least one portion of the adjacent captions element associated with the adjacent segment; and
send, for presentation, the converted captions data with the first segment.

2. The apparatus of claim 1, wherein at least one of:
the adjacent segment and the first segment are consecutive segments; or
the second captions data comprises at least one captions element associated with the adjacent segment and the first segment.

3. The apparatus of claim 1, wherein the second captions data comprises captions identifiers associated with the first segment and the adjacent segment.

4. The apparatus of claim 3, wherein the processor-executable instructions further cause the apparatus to:
remove, from the second captions data, based on the captions identifiers and timing data associated with the first segment, at least one portion of the adjacent captions element associated with the adjacent segment; and
determine, based on the second captions data and the timing data, the converted captions data.

5. The apparatus of claim 1, wherein the processor-executable instructions further cause the apparatus to at least one of:
determine, based on a device type associated with a request for the content item, a converted captions format, wherein the converted captions data comprises the converted captions format; or send at least one of: a portion of a manifest file comprising the converted captions data or a side-car file comprising the converted captions data.

6. An apparatus comprising:

one or more processors; and memory storing processor-executable instructions that, when executed by the one or more processors, cause the apparatus to:
- determine, based on a first segment of a content item, first captions data comprising a first captions element;
- determine, based on an adjacent segment of the content item, adjacent captions data comprising an adjacent captions element;
- determine, based on the first captions element and the adjacent captions element, converted captions data comprising the first captions element and at least one portion of the adjacent captions element associated with the first segment, wherein the converted captions data excludes at least one portion of the adjacent captions element associated with the adjacent segment; and
- cause output of the converted captions data with the first segment.

7. The apparatus of claim 6, wherein the processor-executable instructions further cause the apparatus to:
- determine, based on the first segment and the adjacent segment, a concatenated segment;
- extract, from the concatenated segment, second captions data; and
- determine, based on the second captions data, the converted captions data.

8. The apparatus of claim 6, wherein the processor-executable instructions further cause the apparatus to at least one of:
- determine, based on the first captions data and the adjacent captions data, second captions data comprising captions identifiers associated with the first segment; or
- determine, based on a device type, a converted captions format, wherein the converted captions data comprises the converted captions format.

9. The apparatus of claim 6, wherein the processor-executable instructions further cause the apparatus to: determine, based on the first captions data and the adjacent captions data, second captions data comprising captions identifiers associated with the adjacent segment.

10. The apparatus of claim 9, wherein the processor-executable instructions that cause the apparatus to determine the converted captions data further cause the apparatus to:
- remove, from the second captions data, based on the captions identifiers and timing data associated with the first segment, the at least one portion of the adjacent captions element associated with the adjacent segment; and
- determine, based on the second captions data and the timing data, the converted captions data.

11. A system comprising:

a first computing device configured to:
- determine, based on a first segment of a content item, first captions data comprising a first captions element;
- determine, based on an adjacent segment of the content item, adjacent captions data comprising an adjacent captions element;
- determine, based on the first captions element and the adjacent captions element, converted captions data comprising the first captions element and at least one portion of the adjacent captions element associated with the first segment, wherein the converted captions data excludes at least one portion of the adjacent captions element associated with the adjacent segment; and
- send the converted captions data with the first segment; and a second computing device configured to:
- receive the first segment and the converted captions data; and
- cause the first segment and the converted captions data to be output.

12. The system of claim 11, wherein the first computing device is further configured to:
- determine, based on the first segment and the adjacent segment, a concatenated segment;
- extract, from the concatenated segment, second captions data; and
- determine, based on the second captions data, the converted captions data.

13. The system of claim 11, wherein the first computing device is further configured to determine, based on the first captions data and the adjacent captions data, second captions data comprising captions identifiers associated with the first segment and the adjacent segment.

14. The system of claim 13, wherein the first computing device is configured to determine the converted captions data by:
- removing, from the second captions data, based on the captions identifiers and timing data associated with the first segment, the at least one portion of the adjacent captions element associated with the adjacent segment; and
- determining, based on the second captions data and the timing data, the converted captions data.

15. The system of claim 11, wherein the first computing device is further configured to determine, based on a device type associated with the second computing device, a converted captions format, wherein the converted captions data comprises the converted captions format.

16. The system of claim 11, wherein the converted captions data is associated with at least one captions element, wherein the first computing device is configured to send the converted captions data with the first segment by:
- sending, to the second computing device, a portion of a manifest file associated with at least one segment of the content item and at least one portion of at least one captions element associated with the adjacent segment; and wherein the second computing device is further configured to:
- receive the portion of the manifest file and the at least one portion of at least one captions element; and
- output, based on the portion of the manifest file, the at least one segment and the at least one portion of the at least one captions element, wherein the at least one segment is associated with the first segment.

17. The system of claim 11, wherein the converted captions data comprises a side-car captions file associated with at least one captions element, and wherein the first computing device is configured to send the converted captions data with the first segment by:
- sending, to the second computing device, the side-car captions file; and wherein the second computing device is further configured to:
  receive a manifest file that references the side-car captions file; and
  output, based on the manifest file, at least one segment of the content item and at least one portion of at least one captions element associated with the adjacent segment, wherein the at least one segment is associated with the first segment.

18. One or more non-transitory computer readable media storing processor-executable instructions that, when executed by at least one processor of a computing device, cause the computing device to:
  determine, based on a first segment of a content item, first captions data comprising a first captions element;
  determine, based on an adjacent segment of the content item, adjacent captions data comprising an adjacent captions element;
  determine, based on the first segment and the adjacent segment, a concatenated segment;
  extract, from the concatenated segment, second captions data, wherein the second captions data comprises the first captions element and the adjacent captions element;
  determine, based on the second captions data, converted captions data, wherein the converted captions data comprises the first captions element and at least one portion of the adjacent captions element associated with the first segment, wherein the converted captions data excludes at least one portion of the adjacent captions element associated with the adjacent segment; and
  send, for presentation, the converted captions data with the first segment.

19. The one or more non-transitory computer readable media of claim 18, wherein at least one of:
  the adjacent segment and the first segment are consecutive segments; or
  the second captions data comprises at least one captions element associated with the adjacent segment and the first segment.

20. The one or more non-transitory computer readable media of claim 18, wherein the second captions data comprises captions identifiers associated with the first segment and the adjacent segment.

21. The one or more non-transitory computer readable media of claim 20, wherein the processor-executable instructions further cause the computing device to:
  remove, from the second captions data, based on the captions identifiers and timing data associated with the first segment, at least one portion of the adjacent captions element associated with the adjacent segment; and
  determine, based on the second captions data and the timing data, the converted captions data.

22. The one or more non-transitory computer readable media of claim 18, wherein the processor-executable instructions further cause the computing device to at least one of:
  determine, based on a device type associated with a request for the content item, a converted captions format, wherein the converted captions data comprises the converted captions format; or
  send at least one of: a portion of a manifest file comprising the converted captions data or a side-car file comprising the converted captions data.

23. One or more non-transitory computer readable media storing processor-executable instructions that, when executed by at least one processor of a computing device, cause the computing device to:
  determine, based on a first segment of a content item, first captions data comprising a first captions element;
  determine, based on an adjacent segment of the content item, adjacent captions data comprising an adjacent captions element;
  determine, based on the first captions element and the adjacent captions element, converted captions data comprising the first captions element and at least one portion of the adjacent captions element associated with the first segment, wherein the converted captions data excludes at least one portion of the adjacent captions element associated with the adjacent segment; and
  cause output of the converted captions data with the first segment.

24. The one or more non-transitory computer readable media of claim 23, wherein the processor-executable instructions further cause the computing device to:
  determine, based on the first segment and the adjacent segment, a concatenated segment;
  extract, from the concatenated segment, second captions data; and
  determine, based on the second captions data, the converted captions data.

25. The one or more non-transitory computer readable media of claim 23, wherein the processor-executable instructions further cause the computing device to at least one of:
  determine, based on the first captions data and the adjacent captions data, second captions data comprising captions identifiers associated with the first segment; or
  determine, based on a device type, a converted captions format, wherein the converted captions data comprises the converted captions format.

26. The one or more non-transitory computer readable media of claim 23, wherein the processor-executable instructions further cause the computing device to:
  determine, based on the first captions data and the adjacent captions data, second captions data comprising captions identifiers associated with the adjacent segment.

27. The one or more non-transitory computer readable media of claim 26, wherein the processor-executable instructions that cause the computing device to determine the converted captions data further cause the computing device to:
  remove, from the second captions data, based on the captions identifiers and timing data associated with the first segment, the at least one portion of the adjacent captions element associated with the adjacent segment; and
  determine, based on the second captions data and the timing data, the converted captions data.

28. One or more non-transitory computer readable media storing processor-executable instructions that, when executed by at least one processor of a computing device, cause the computing device to:
  determine, based on a first segment of a content item, first captions data comprising a first captions element;
  determine, based on an adjacent segment of the content item, adjacent captions data comprising an adjacent captions element;

determine, based on the first captions element and the adjacent captions element, converted captions data comprising the first captions element and at least one portion of the adjacent captions element associated with the first segment, wherein the converted captions data excludes at least one portion of the adjacent captions element associated with the adjacent segment; and send the converted captions data with the first segment.

29. The one or more non-transitory computer readable media of claim 28, wherein the processor-executable instructions further cause the computing device to:

determine, based on the first segment and the adjacent segment, a concatenated segment;

extract, from the concatenated segment, second captions data; and determine, based on the second captions data, the converted captions data.

30. The one or more non-transitory computer readable media of claim 28, wherein the processor-executable instructions further cause the computing device to determine, based on the first captions data and the adjacent captions data, second captions data comprising captions identifiers associated with the first segment and the adjacent segment.

31. The one or more non-transitory computer readable media of claim 30, wherein the processor-executable instructions that cause the computing device to determine the converted captions data further cause the computing device to:

remove, from the second captions data, based on the captions identifiers and timing data associated with the first segment, the at least one portion of the adjacent captions element associated with the adjacent segment; and determine, based on the second captions data and the timing data, the converted captions data.

32. The one or more non-transitory computer readable media of claim 28, wherein the processor-executable instructions further cause the computing device to determine, based on a device type associated with a request for the content item, a converted captions format, wherein the converted captions data comprises the converted captions format.

33. The one or more non-transitory computer readable media of claim 28, wherein the converted captions data is associated with at least one captions element, and wherein the processor-executable instructions that cause the computing device to send the converted captions data with the first segment further cause the computing device to:

send, to a user device, a portion of a manifest file associated with at least one segment of the content item and at least one portion of at least one captions element associated with the adjacent segment, wherein the user device outputs the at least one segment and the at least one portion of the at least one captions element based on the portion of the manifest file, wherein the at least one segment is associated with the first segment.

34. The one or more non-transitory computer readable media of claim 28, wherein the converted captions data comprises a side-car captions file associated with at least one captions element, and wherein the processor-executable instructions that cause the computing device to send the converted captions data with the first segment further cause the computing device to:

send, to a user device, the side-car captions file, wherein the user device outputs at least one segment of the content item and at least one portion of at least one captions element associated with the adjacent segment based on a manifest file that references the side-car captions file, wherein the at least one segment is associated with the first segment.

* * * * *